US009052478B2

(12) United States Patent
Charbonneau-Lefort

(10) Patent No.: US 9,052,478 B2
(45) Date of Patent: Jun. 9, 2015

(54) TOTAL-INTERNAL-REFLECTION FIBER OPTIC INTERFACE MODULES WITH DIFFERENT OPTICAL PATHS AND ASSEMBLIES USING SAME

(75) Inventor: Mathieu Charbonneau-Lefort, San Jose, CA (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/436,108

(22) Filed: Mar. 30, 2012

(65) Prior Publication Data
US 2013/0259419 A1 Oct. 3, 2013

(51) Int. Cl.
*G02B 6/42* (2006.01)
*G02B 6/32* (2006.01)

(52) U.S. Cl.
CPC ............... *G02B 6/4214* (2013.01); *G02B 6/32* (2013.01)

(58) Field of Classification Search
CPC ............................................................. G02B 6/32
See application file for complete search history.

(56) References Cited

U.S. PATENT DOCUMENTS

| 4,344,668 | A | 8/1982 | Gunther et al. ............... 350/334 |
| 4,998,794 | A | 3/1991 | Holzman ................... 350/96.18 |
| 5,555,331 | A | 9/1996 | Billet et al. ...................... 385/49 |
| 5,659,643 | A | 8/1997 | Appledorn et al. ............. 385/31 |
| 6,198,864 | B1 * | 3/2001 | Lemoff et al. ................... 385/47 |
| 6,257,771 | B1 | 7/2001 | Okayasu ......................... 385/89 |
| 6,257,772 | B1 | 7/2001 | Nakanishi et al. .............. 385/89 |
| 6,328,484 | B1 * | 12/2001 | Uebbing .......................... 385/93 |
| 6,488,417 | B2 * | 12/2002 | Kropp .............................. 385/88 |
| 6,491,447 | B2 * | 12/2002 | Aihara ............................. 385/92 |
| 6,751,376 | B2 * | 6/2004 | Hammond ...................... 385/31 |
| 6,813,418 | B1 | 11/2004 | Kragl ............................... 385/49 |
| 6,874,950 | B2 | 4/2005 | Colgan et al. ................... 385/88 |
| 6,952,508 | B2 | 10/2005 | Simons et al. .................. 385/31 |
| 6,956,995 | B1 | 10/2005 | Shafaat et al. .................. 385/39 |
| 7,066,657 | B2 | 6/2006 | Murali et al. ................... 385/92 |
| 7,399,125 | B1 * | 7/2008 | Whaley et al. .................. 385/92 |
| 7,543,994 | B2 * | 6/2009 | McColloch ..................... 385/89 |

(Continued)

FOREIGN PATENT DOCUMENTS

| EP | 0613032 A2 | 11/1994 | ............... G02B 6/44 |
| EP | 1109041 A1 | 6/2001 | ............... G02B 6/44 |

(Continued)

OTHER PUBLICATIONS

Parks, et al., "Passively Aligned Transmit Optical Subassembly Module Based on a WDM Incorporating VCSELs," IEEE Photonics Technology Letters, vol. 22, p. 1790, 2010.

(Continued)

*Primary Examiner* — Charlie Y Peng

(57) ABSTRACT

Fiber optic interface modules and assemblies using same are disclosed, wherein the module includes first and second lenses formed therein that utilize total-internal reflection within the module body. The first and second lenses define first and second optical paths of different lengths. The module may operably support first and second optical fibers so that they are optically coupled to surfaces of the first and second lenses. The first and second lenses are designed to provide predetermined tolerances for lateral offsets relative to first and second active photo-devices while maintaining respective first and second coupling efficiencies between the active photo-devices and the corresponding first and second optical fibers.

29 Claims, 30 Drawing Sheets

(56) References Cited

U.S. PATENT DOCUMENTS

| | | | |
|---|---|---|---|
| 7,547,151 B2* | 6/2009 | Nagasaka | 385/93 |
| 7,630,593 B2* | 12/2009 | Furuno et al. | 385/14 |
| 7,680,376 B2* | 3/2010 | Goebel et al. | 385/14 |
| 7,773,836 B2 | 8/2010 | De Dobbelaere | 385/14 |
| 8,165,432 B2 | 4/2012 | Ohta et al. | 385/15 |
| 8,295,671 B2* | 10/2012 | DeMeritt et al. | 385/140 |
| 8,315,492 B2* | 11/2012 | Chen et al. | 385/33 |
| 8,641,296 B2* | 2/2014 | Nishimura | 385/92 |
| 2001/0053260 A1 | 12/2001 | Takizawa et al. | 385/14 |
| 2002/0076152 A1 | 6/2002 | Hughes et al. | 385/35 |
| 2002/0126335 A1 | 9/2002 | Dieckroger et al. | 359/110 |
| 2003/0044119 A1 | 3/2003 | Sasaki et al. | 385/49 |
| 2003/0142896 A1 | 7/2003 | Kikuchi et al. | 385/14 |
| 2004/0033016 A1* | 2/2004 | Kropp | 385/31 |
| 2004/0234210 A1 | 11/2004 | Nagasaka et al. | 385/88 |
| 2005/0141823 A1* | 6/2005 | Han et al. | 385/89 |
| 2008/0068719 A1 | 3/2008 | Hayashi et al. | 385/622 |
| 2009/0169163 A1 | 7/2009 | Abbott, III et al. | 385/127 |
| 2010/0142886 A1 | 6/2010 | Warashina et al. | 385/14 |
| 2010/0272403 A1 | 10/2010 | Chen et al. | 385/93 |
| 2011/0108716 A1 | 5/2011 | Shiraishi | 250/227.24 |
| 2011/0123150 A1 | 5/2011 | Zbinden et al. | 385/33 |
| 2011/0123151 A1* | 5/2011 | Zbinden et al. | 385/33 |
| 2011/0134679 A1 | 6/2011 | Suh et al. | 365/64 |
| 2011/0317959 A1 | 12/2011 | Ohta et al. | 385/38 |
| 2012/0027346 A1 | 2/2012 | Castagna et al. | 385/33 |
| 2012/0189254 A1 | 7/2012 | Wang et al. | 385/93 |

FOREIGN PATENT DOCUMENTS

| | | | |
|---|---|---|---|
| JP | 2001-51162 A | 2/2001 | G02B 6/42 |
| JP | 2001-174671 A | 6/2001 | G02B 6/42 |
| JP | 2005-31556 A | 2/2005 | G02B 6/32 |
| JP | 2006-23777 A | 1/2006 | G02B 6/42 |
| JP | 2007-121973 A | 5/2007 | G02B 6/42 |
| WO | WO2006/088859 A2 | 8/2006 | G02B 6/36 |

OTHER PUBLICATIONS

Patent Cooperation Treaty, International Search Report for PCT/US2013/033995, Jul. 22, 2013, 12 pages.

Patent Cooperation Treaty, International Search Report for PCT/US2013/033998, Jul. 1, 2013, 11 pages.

Patent Cooperation Treaty, International Search Report for PCT/US2013/034035, Jun. 24, 2013, 11 pages.

* cited by examiner

TOTAL-INTERNAL-REFLECTION FIBER OPTIC INTERFACE MODULES WITH DIFFERENT OPTICAL PATHS AND ASSEMBLIES USING SAME

CROSS-REFERENCE TO RELATED APPLICATIONS

This application is related to U.S. patent application Ser. No. 13/436,165, entitled "Total-internal-reflection fiber optic interface modules and assemblies," and to U.S. patent application Ser. No. 13/436,197, entitled "Misalignment-tolerant total-internal-reflection fiber optic interface modules and assemblies with high coupling efficiency," filed on even date herewith, and which are incorporated by reference in their entirety herein.

FIELD

The present disclosure relates to fiber optic interface modules and assemblies using the modules, and in particular to such modules and assemblies wherein the module employs total internal reflection and has different optical paths for transmit and receive channels that are respectively associated with active photo-devices such as a light source and a photo-detector.

BACKGROUND ART

Short-distance data links used for consumer electronics are reaching increasingly higher data rates, especially those used for video and data storage applications. Examples include the USB 3.0 protocol at 5 Gb/s, HDMI at 10 Gb/s and Thunderbolt at 10 Gb/s over two channels. At such high data rates, traditional copper cables have limited transmission distance and may be relatively large, thereby limiting cable flexibility and increasing expense. For at least these reasons, optical fiber is emerging as an alternative to copper wire for accommodating the high data rates for the next generations of consumer electronics.

Unlike telecommunication applications that employ expensive, high-power edge-emitting lasers along with modulators, short-distance optical fiber links are based on low-cost, low-power, directly modulated light sources such as vertical-cavity surface-emitting lasers (VCSELs). To be viable for consumer electronics, the fiber optic interface modules and assemblies used to couple light from the light source into an optical fiber in one direction and light traveling in another optical fiber onto the photodiode in the other direction need to be low-cost. Thus, there is an unresolved need for the design of fiber optic interface modules and assemblies that are simple, robust, reliable, forgiving misalignment tolerances and/or a passive alignment process.

SUMMARY

An aspect of the disclosure is fiber optic interface module configured to support first and second optical fibers, comprising: a module body that defines front and rear ends, a top surface, a bottom surface and opposing sides, and having optical pathways that are substantially transparent to light having an infrared wavelength; first and second optical fiber support features formed in the top surface; a ridge formed in the top surface and having first and second end walls that respectively terminate the first and second optical fiber support features, and an angled wall that defines a total-internal-reflection (TIR) mirror; a recess formed in the module body in the bottom surface adjacent the front end and that defines a ceiling; and first and second lens surfaces formed on the ceiling and having respective first and second folded lens axes that are aligned with the first and second optical fiber support features and the TIR mirror, with the first and second lens surfaces and the first and second end walls respectively defining first and second lenses having different first and second folded optical paths.

Another aspect of the disclosure is the fiber optic interface module, wherein the first and second folded lens axes have a misalignment tolerance of ±20 microns or greater while maintaining coupling efficiencies of 85% or greater.

Another aspect of the disclosure is the fiber optic interface module, further comprising the first and second lens surfaces being integrally formed by the module body.

Another aspect of the disclosure is the fiber optic interface module, wherein the first and second lens surfaces have different curvatures.

Another aspect of the disclosure is the fiber optic interface module, wherein the first and second lens surfaces have a hyperbolic shape.

Another aspect of the disclosure is the fiber optic interface module, wherein the ceiling respectively has a first planar section and a second planar section, with the first and second planar sections lying in different planes.

Another aspect of the disclosure is the fiber optic interface module, wherein the infrared wavelength is in the range of 800 nanometers to 1100 nanometers.

Another aspect of the disclosure is the fiber optic interface module, wherein the module body is monolithic.

Another aspect of the disclosure is the fiber optic interface module, wherein the optical fiber support features comprise a plurality of grooves that run substantially parallel to the opposing sides.

Another aspect of the disclosure is the fiber optic interface module, wherein the top surface includes first and second portions wherein the first and second optical fiber support features are respectively formed, the first and second portions having different heights relative to the bottom surface of the module body.

Another aspect of the disclosure is the fiber optic interface module, wherein the ridge includes first and second sections displaced from one another relative to the rear end of the module body.

Another aspect of the disclosure is the fiber optic interface module, wherein the ridge includes first and second surface portions that respectively terminate the first and second optical fiber alignment features and that are displaced from one another relative to the rear end of the module body.

Another aspect of the disclosure is a fiber optic interface assembly that comprises: the module; first and second optical fibers respectively supported in the first and second optical fiber support features, with the first and second optical fibers having respective first and second ends that respectively interface with the first and second end walls of the fiber optic interface module; and first and second active photo-devices operably arranged at respective first and second front focus distances from the first and second lens surfaces so that the first and second active photo-devices are in respective optical communication with the first and second optical fibers over the first and second folded optical paths, respectively.

Another aspect of the disclosure is the fiber optic interface assembly, wherein the first and second active photo-devices respectively include a light source and a photodetector, and wherein the first folded optical path has a shorter length than the second optical path.

Another aspect of the disclosure is the fiber optic interface assembly, further comprising: a printed circuit board (PCB) that supports the fiber optic interface module; at least one integrated circuit (IC) chip operably supported by the PCB and that is operably connected to the first and second active photo-devices; and wherein either the PCB or the IC chip operably supports the first and second photo-devices.

Another aspect of the disclosure is the fiber optic interface assembly, further comprising: a cover configured to mate with and cover the top surface of the module body.

Another aspect of the disclosure is the fiber optic interface assembly, further comprising: the first lens being configured to provide a first predetermined misalignment tolerance of ±20 microns for a first lateral offset between the first active photo-device and the first lens axis while maintaining a first coupling efficiency of 85% or greater between the first active photo-device and the first optical fiber; and the second lens being configured to provide a second predetermined misalignment tolerance of ±20 microns for a second lateral offset between the second active photo-device and the second lens axis while maintaining a second coupling efficiency of 85% or greater between the second active photo-device and the second optical fiber.

Another aspect of the disclosure is an optical-electrical connector that comprises: the fiber optic interface assembly; a contact assembly electrically interfaced with the PCB; a metal plug interface that operably houses the fiber optic interface assembly and the contact assembly; and a connector shell that operably houses the metal plug interface.

Another aspect of the disclosure is a fiber optic interface module configured to support first and second optical fibers and to interface with first and second active photo-devices, comprising: a module body that defines front and rear ends, a top surface configured to support the first and second optical fibers and a bottom surface that supports first and second lens surfaces, wherein the module body is substantially transparent to light having an infrared wavelength; a ridge formed in the top surface and having an angled wall that defines a total-internal-reflection (TIR) mirror; a first lens defined by the first lens surface, the first end wall, the TIR mirror and a portion of the module body that resides between the first lens surface and the first end wall, the first lens defining a first folded optical path between the first active photo-device and the first optical fiber; and a second lens defined by the second lens surface, the second end wall, the TIR mirror and a portion of the module body that resides between the second lens surface and the second end wall, the second lens defining a second folded optical path between the second active photo-device and the second optical fiber, wherein the first and second folded optical paths have different lengths.

Another aspect of the disclosure is the fiber optic interface module, wherein the first lens is configured to provide a first predetermined misalignment tolerance of ±20 microns for a first lateral offset between the first active photo-device and the first lens axis while maintaining a first coupling efficiency of 85% of greater between the first active photo-device and the first optical fiber; and the second lens is configured to provide a second predetermined misalignment tolerance of ±20 microns for a second lateral offset between the second active photo-device and the second lens axis while maintaining a second coupling efficiency of 85% or greater between the second active photo-device and the second optical fiber.

Another aspect of the disclosure is the fiber optic interface module, wherein the first and second lens surfaces have a hyperbolic shape with different conic constants.

Another aspect of the disclosure is a fiber optic interface assembly, comprising: a fiber optic interface module having a body that is transparent to infrared light and that supports first and second lenses respectively having first and second optical powers defined by first and second lens surfaces, the first and second lenses defining respective first and second folded optical paths of different lengths through the module body; first and second optical fibers respectively operably supported by the fiber optic interface module, the first and second optical fibers having respective first and second ends that respectively interface with first and second substantially planar surfaces of the first and second lenses; and first and second active photo-devices that are operably spaced apart from the first and second lens surfaces so that the first and second active photo-devices are in respective optical communication with first and second optical fibers over the first and second folded optical paths, respectively.

Another aspect of the disclosure is the fiber optic interface assembly, wherein the first and second active photo-devices are supported on a planar support surface of either an integrated circuit (IC) chip or a printed circuit board (PCB), and wherein the first and second optical fibers are supported on a top surface of the fiber optic interface module, wherein the top surface and the planar support surface are substantially parallel.

Another aspect of the disclosure is the fiber optic interface assembly, wherein the module body includes at least one first passive alignment feature and the PCB includes at least one second passive alignment feature cooperatively configured with the at least one first passive alignment feature for allowing for passive alignment between the module and the PCB.

Another aspect of the disclosure is the fiber optic interface assembly, wherein the first and second active photo-devices respectively include a light source and a photodetector, and wherein the first folded optical path is shorter than the second optical path.

Another aspect of the disclosure is the fiber optic interface assembly, wherein: the first lens is configured to provide a first predetermined misalignment tolerance for a first lateral offset of ±20 microns between the first active photo-device and the first lens axis while maintaining a first coupling efficiency of 85% or greater between the first active photo-device and the first optical fiber; and the second lens is configured to provide a second predetermined misalignment tolerance for a second lateral offset of ±20 microns between the second active photo-device and the second lens axis while maintaining a second coupling efficiency of greater than 85% between the second active photo-device and the second optical fiber.

Another aspect of the disclosure is an optical-electrical connector, comprising: the fiber optic interface assembly as described above; a contact assembly electrically interfaced with the PCB; a metal plug interface that operably houses the fiber optic interface assembly and the contact assembly; and a connector shell that operably houses the metal plug interface.

Another aspect of the disclosure is the fiber optic interface assembly, comprising: a fiber optic interface module that has a body that is transparent to infrared light and that supports first and second lenses respectively having first and second optical powers defined by first and second lens surfaces, the first and second lenses defining respective first and second folded optical paths through the module body; first and second optical fibers respectively operably supported by the fiber optic interface module, the first and second optical fibers having respective first and second ends that respectively interface with first and second substantially planar surfaces of the first and second lenses; a printed circuit board having a surface that is spaced apart from the first and second lens surfaces; first and second active photo-devices operably supported on the printed circuit board surface so as to be in respective optical communication with first and second optical fibers over the first and second folded optical paths, and wherein the first active photo-devices have first and second heights relative to the printed circuit board surface that define different lengths for the first and second folded optical paths.

Another aspect of the disclosure is an optical-electrical connector, comprising: the fiber optic interface assembly described above; a contact assembly electrically interfaced with the PCB; a metal plug interface that operably houses the fiber optic interface assembly and the contact assembly; and a connector shell that operably houses the metal plug interface.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various embodiments of the disclosure and together with the description set forth herein serve to explain the principles and operations of the disclosure. The claims are incorporated into and constitute part of the Detailed Description set forth below.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

The present disclosure relates to fiber optic interface modules and assemblies, and in particular to such modules and assemblies wherein the module employs total internal reflection and folded source and detector optical paths within the module body.

Example embodiments of the fiber optic interface module are first discussed, followed by exemplary embodiments of fiber optic interface assemblies that employ the fiber optic interface module. Example configurations for the source and detector lenses associated with the fiber optic interface module and transmit and receive channels are then described in connection with source and detector optical systems.

Fiber Optic Interface Module

Figure 1:
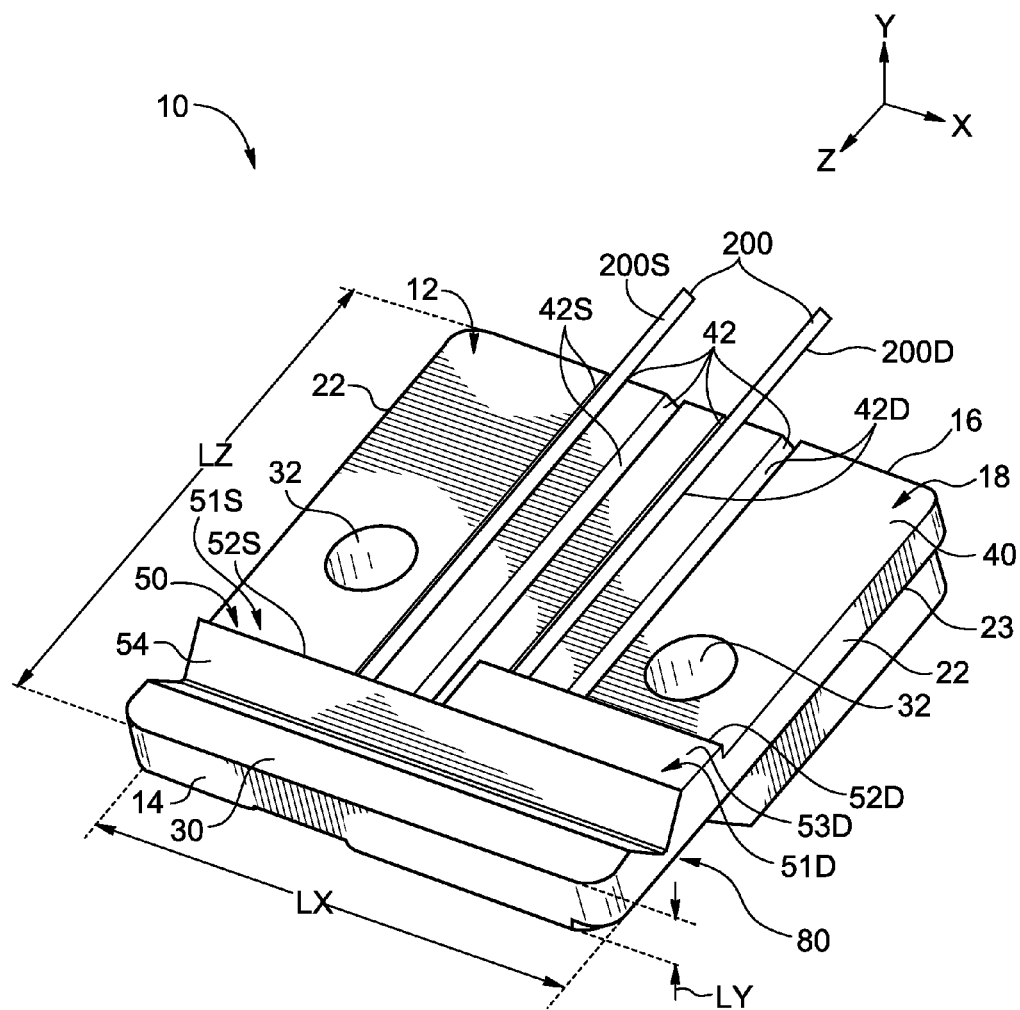
FIG. 1 is a top-down elevated view of an exemplary fiber optic interface module according to the disclosure.
Figure 2:
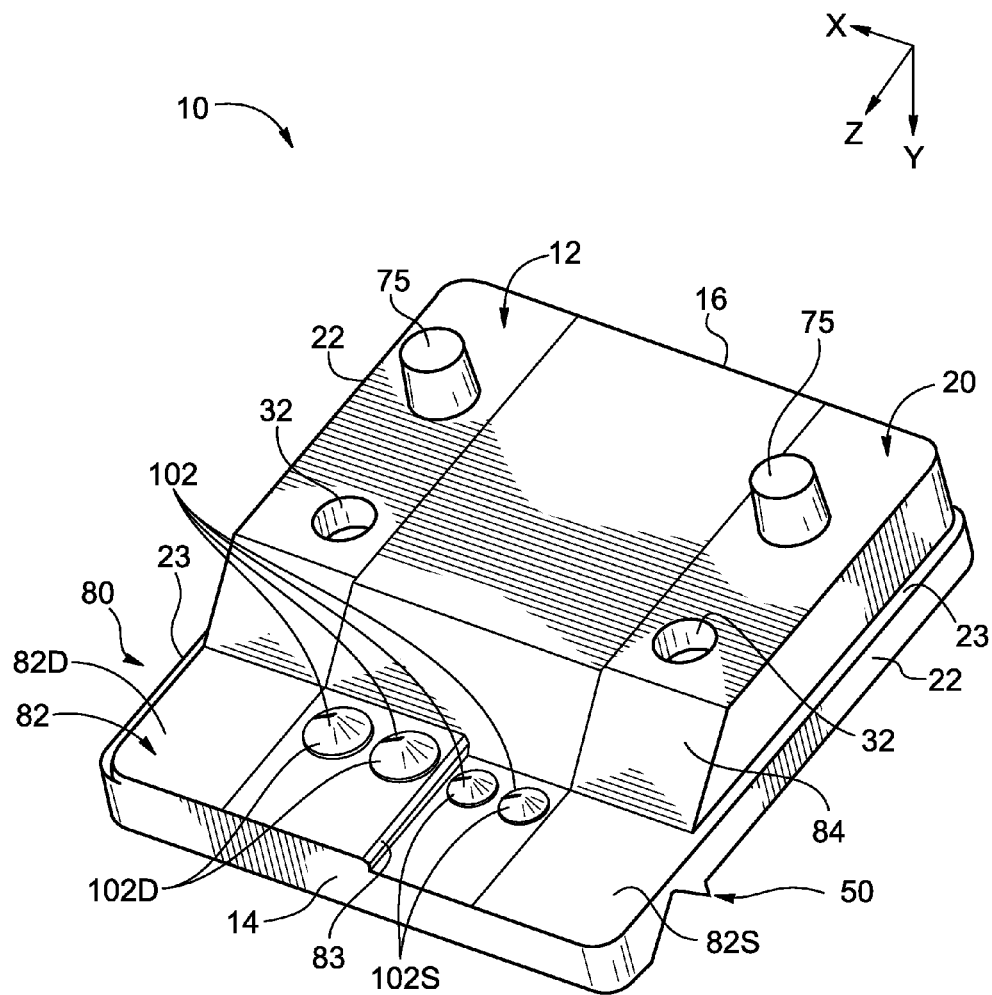
FIG. 2 is a bottom-up view of the fiber optic interface module of FIG. 1.
Figure 3A:
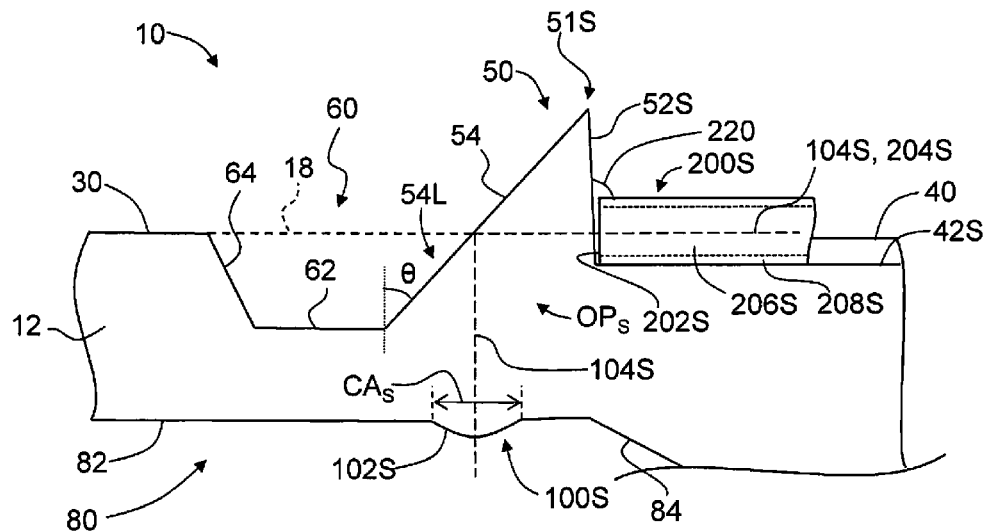
FIG. 3A is a close-up cross-sectional view of the fiber optic interface module as taken along one of the source optical fiber support features, showing the region around a ridge that runs across a portion of the module and whose angled wall serves as a total-internal-reflection mirror.
Figure 3B:
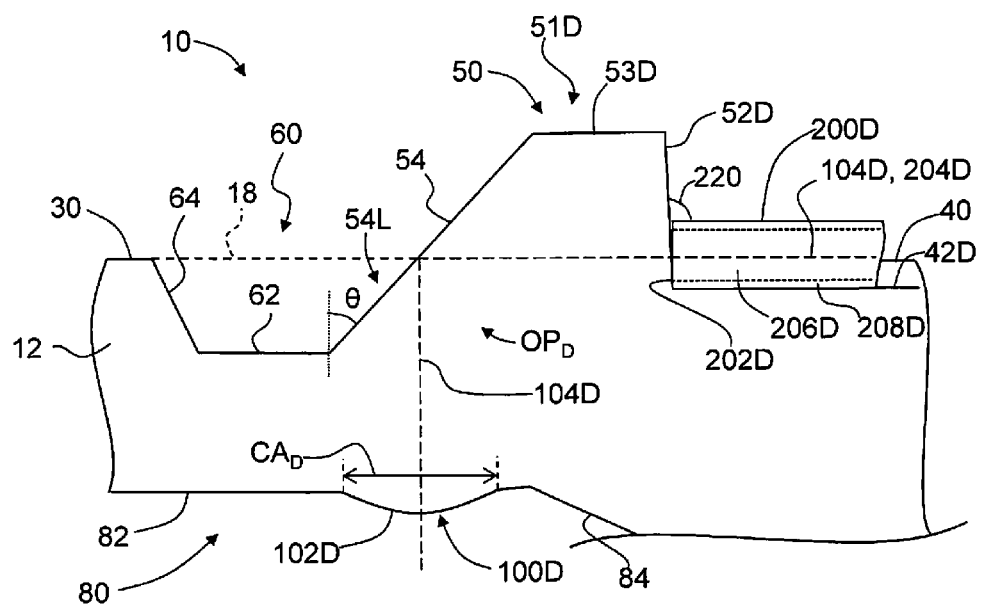
FIG. 3B is similar to FIG. 3A, but with the cross-section taken along one of the detector optical fiber support features.

FIG. 1 is a top-down elevated view of an exemplary fiber optic interface module (hereinafter "module") 10 according to the disclosure. FIG. 2 is a bottom-up view of the module 10 of FIG. 1, while FIG. 3A and FIG. 3B are cross-sectional views of the example module 10 of FIGS. 1 and 2 as taken in the Y-Z plane along respective source and detector optical fiber support features 42S and 42D (introduced and discussed below).

The module 10 has a body 12 that in this embodiment generally has a rectangular parallelepiped (also referred to as a rectangular cuboid) that includes additional features formed therein as described below, but other suitable general shapes are possible. The body 12 defines a front end 14, a rear end 16 that may be substantially parallel to the front end, a top surface 18 and a bottom surface 20 that is generally parallel to the top surface. The body 12 also defines sides 22 that in this embodiment each include a ledge 23. The module 10 has dimensions of length LZ, width LX and height LY as shown in FIG. 1. Examples of these dimensions include 5 mm≤LZ≤10 mm, 2 mm≤LX≤10 mm, and 1 mm≤LY≤4 mm, but other suitable dimensions are possible.

The top surface 18 includes a front top-surface section 30 that is adjacent front end 14. The top surface 18 also includes a main top-surface section 40 that is adjacent rear end 16. The main top-surface section 40 includes two alignment holes 32 that are formed adjacent respective sides 22 about mid-way between front and rear ends 14 and 16, and that extend through to bottom surface 20 in the Y direction. The alignment holes 32 may serve as passive alignment features, as explained below. The main top-surface section 40 also includes one or more optical fiber support features 42. Some of optical fiber support features 42 are configured to accommodate source optical fibers 200S associated with respective light sources (discussed below) and are referred to as source optical fiber support features 42S. Likewise, some of optical fiber support features 42 are configured to accommodate detector optical fibers 200D associated with respective photodetectors (also discussed below) and are referred to as detector optical fiber support features 42D. In an example, optical fiber support features 42 comprise grooves that generally run in the Z direction, i.e., generally parallel to sides 22. In an example, the grooves are V-shaped, i.e., have a V-shaped cross-section; however, other structures are possible such as U-channels, bores or the like.

By way of example, optical fibers 200 suitable for use as source and detector optical fibers 200S and 200D are multimode optical fibers, such as for example a large-core, high-numerical-aperture optical fiber, e.g., the VSDN™ optical fiber, available from Corning, Inc., of Corning, N.Y. Explanatory optical fibers 200 are also discussed in published PCT Patent Application Publication No. WO2010036684, entitled "High numerical aperture multimode optical fiber," but the use of other suitable optical fibers is possible with the concepts disclosed herein.

The top surface 18 of module 10 also includes a ridge 50 that separates the front and main top-surface sections 30 and 40 and that runs across the module 10, i.e., in the X direction. FIG. 3A is a close-up cross-sectional view of the region of module body 12 around ridge 50 as taken along a source optical fiber support feature 42S. FIG. 3A shows an end section of source optical fiber 200S residing in source optical fiber support feature 42S. FIG. 3B is similar to FIG. 3A and is a close-up cross-sectional view of the region of module body 12 around ridge 50 as taken along a detector optical fiber support feature 42D. FIG. 3B shows an end section of detector optical fiber 200D residing in detector optical fiber support feature 42D.

The source optical fiber 200S has an end 202S and a central axis 204S that coincides with the central axis of an optical fiber core ("core") 206S, which has an index of refraction $n_C$. The core 206S is surrounded by a cladding 208S having an index of refraction $n_{CL}$, where $n_{CL} < n_C$. In one non-limiting example, source optical fiber 200S has a numerical aperture $NA_{FS} = 0.29$, but the use of optical fibers with other values of numerical apertures are possible. Also in an example, core 206S has a gradient-index profile, which in an example is a parabolic profile. In an example, core 206S has a diameter of about 80 microns. Likewise, detector optical fiber 200D has an end 202D, a central axis 204D, a core 206D (which may have a gradient index), and a cladding 208D. In an example, source optical fiber 200S and detector optical fiber 200D are the same type of optical fiber, but they may be different as desired.

As shown in FIG. 1, ridge 50 includes a source section 51S and a detector section 51D. In this exemplary embodiment ridge 50, source section 51S of ridge 50 has a generally triangular cross-sectional shape and includes an end wall 52S that may be substantially vertical facing rear end 16. The end wall 52S terminates source optical fiber support features 42S. The detector section 51D of ridge 50 includes an extended portion 53D that extends toward rear end 16 and that defines an end wall 52D that may be substantially vertical and terminates detector optical fiber support features 42D. Because of extended portion 53D, detector optical fiber support features 42D have a shorter length than source optical fiber support features 42S. The ridge 50 also includes an angled wall 54 that faces front end 14 and that slopes away from the front end at an angle θ relative to top surface 18 (FIGS. 3A and 3B). In an example, angle θ is substantially 45 degrees, but other suitable angles are possible as desired. In the example shown, end walls 52S and 52D are offset in the Z direction and so lie in different planes (see FIG. 1). However, in other embodiments end walls 52S and 52D may be part of the same planar end wall 52, and in an example, the two end walls are planar and lie in the same plane.

As mentioned above, end wall 52S of source section 51S of ridge 50 terminates source optical fiber support features 42S, and in an example does so at substantially a right angle. Likewise, end wall 52D of detector section 51D of ridge 50 terminates detector optical fiber support features 42D, and in an example does so at substantially a right angle. The optical fiber support features 42 are open at rear end 16. Also in an example, end walls 52S and 52D can depart from being purely vertical by a small amount (e.g., by 2°). This allows for an index-matching material 220 (e.g., an epoxy) to flow around respective ends 202S and 202D of source optical fibers 200S and detector optical fibers 200D and reside between these optical fiber ends and their respective end walls 52S and 52D without trapping an air bubble therebetween. The end walls 52S and 52D serve as respective mechanical stops for optical fiber ends 202S and 202D and establish the longitudinal position (i.e., the Z-directional position) of optical fibers 200 in their respective optical fiber support features 42.

As shown in FIGS. 3A and 3B, angled wall 54 includes a lower portion 54L that also serves as a rear wall of a trench 60 formed adjacent ridge 50 toward front end 14 and immediately adjacent angled wall 54. Angled wall 54 forms a total internal reflection (TIR) surface or mirror for turning the optical signal as discussed herein. The trench 60 also includes a floor 62 and a front wall 64 toward front end 14 and opposite angled wall 54. The trench 60 can also be such that floor 62 is curved so that the floor, front wall 64 and rear wall (lower portion) 54L form one continuously curved surface, with the lower portion/rear wall being linearly sloped.

The trench 60 serves to provide for a lengthier air-body interface for angled wall 54 than would be possible were the angled wall terminated at top surface 18, which is shown in phantom for reference. This allows for angled wall 54 to serve as an optical turn having a substantially 90-degree total-internal-reflection (TIR) surface whose purpose is described in greater detail below, and is referred to hereinafter as TIR mirror 54. In other words, the interface between the material of the angled wall 54 and the air create an interface with different indices of refraction for turning the optical signal.

As best seen in FIG. 2 and FIGS. 3A and 3B (and also FIG. 4B, introduced and discussed below), module body 12 includes a recess 80 formed in bottom surface 20 adjacent front end 14. The recess 80 defines a ceiling 82 and an end wall 84, the latter of which is shown as sloping away from front end 14. The ceiling 82 includes, near end wall 84, a plurality of lens surfaces 102 that each define, along with TIR mirror 54, corresponding folded lens axes such as folded lens axes 104S and 104D that respectively pass through end walls 52S and 52D of ridge 50 for turning the optical signals such as at substantially right angles. Although, this embodiment shows ceilings on different planes and the a ridge for achieving different path lengths the structures may be used independently for achieving different path lengths between the transmit folded lens and the receive folded lens. Different exemplary configurations for module body 10 that illustrate alternate embodiments for achieving the different path lens are discussed below. The particular embodiment as illustrated in FIG. 2 and FIGS. 3A, 3B and 4B is used for convenience and by way of non-limiting example.

The plurality of lens surfaces 102 includes at least one source lens surface 102S that is part of a source lens 100S and that has a source lens axis 104S and a clear aperture $CA_S$. The plurality of lens surfaces 102 also includes at least one detector lens surface 102D that is part of a detector lens 100D that has a detector lens axis 104D and a clear aperture $CA_D$. The ceiling 82 has a source section 82S that includes at least one source lens surface 102S. Likewise, ceiling 82 has a detector section 82D that includes at least one detector lens surface 102D. In an example, the source and detector sections 82S and 82D of ceiling 82 are both generally planar but lie in different planes, e.g., are offset or displaced relative to one another in the Y direction by a step 83 that resides between detector section 82D and source section 82S such as roughly halfway between sides 22 of module body 12. The step 83 can be a sharp (i.e., a substantially right-angled) step or it can be sloped as desired.

The module 10 also optionally includes alignment posts 75 that are formed in bottom surface 20 toward sides 22 and near rear end 16 and that extend outward from the bottom surface, i.e., in the −Y direction. The alignment posts 75 serve as additional passive alignment features, as explained in greater detail below and may aid in attaching module 10 to a mounting surface The one or more source lens surfaces 102S and the associated one or more folded source lens axes 104S are aligned with the corresponding one or more source optical fiber support features 42S along the Z direction, with one source lens surface 102S for each source optical fiber 200S. Likewise, one or more detector lens surfaces 102D and the associated one or more folded detector lens axes 104D are aligned with the corresponding one or more detector optical fiber support features 42D along the Z direction, with one detector lens surface 102D for each detector optical fiber 200D. Of course, the concepts disclosed herein may be used with a single detector lens axis and a single source lens axis or multiple detector and source lens axis in any arrangement as desired.

In an example, the respective portions of folded source and detector lens axes 104S and 104D that run in the Z direction coincide with the respective source and detector optical fiber central axes 204S and 204D when the corresponding optical fiber 200 resides in the corresponding optical fiber support feature 42. Thus, source optical fiber support features 42S are configured so that a given source optical fiber central axis 204S and a given source lens axis 104S intersect such as at substantially at right angles and substantially at angled wall 54, but as discussed herein the angle may vary as desired. Likewise, detector optical fiber support features 42D are configured so that a given detector optical fiber central axis 204D and a given detector lens axis 104D intersect such as substantially at right angles and substantially at angled wall 54, but the angle may also vary.

The folded source and detector lens axes 104S and 104D define respective sections of a folded light-source ("source") optical path $OP_S$ and a folded photodetector ("detector") optical path $OP_D$, wherein a portion of each optical path is within module body 12, as discussed below. These source and detector optical paths $OP_S$ and $OP_D$ respectively represent portions of transmit and receive channels when module 10 is used in a fiber optic interface assembly, as discussed below. Moreover, the fiber optic interface assembly may be a portion of an active optic cable (AOC) assembly or other structure as desired.

The source lens surface 102S, TIR mirror 54, the corresponding portion of end wall 52S and the corresponding portion of module body 12 therebetween define source lens 100S and its folded optical axis 104S. The source lens surface 102S is considered herein as the front lens surface and end wall 52S is considered the rear lens surface of the source lens 100S. The axial distance between the front and rear lens surfaces 102S and 52S is the lens thickness (i.e., the thickness of the module body 12 between these surfaces) and is denoted d2S (see FIG. 8A).

Similarly, detector lens surface 102D, TIR mirror 54, the corresponding portion of end wall 52D and the corresponding portion of module body 12 therebetween (including extended portion 53D of ridge 50) define detector lens 100D and its folded optical axis 104D. The detector lens surface 102D is considered herein the front lens surface and end wall 52D is considered the rear lens surface of the detector lens 100D even though in operation the detector light (introduced below) travels in the direction from end wall 52D to detector lens surface 102D. The axial distance between the front and rear lens surfaces 102S and 52D is the lens thickness (i.e., the thickness of the module body 12 between these surfaces) and is denoted d2D (see FIG. 9A).

In an example, at least one of source and detector lens surfaces 102S and 102D are formed integrally on their respective ceiling sections 82S and 82D, i.e., are integral with module body 12 and so constitute curved portions of the module body. In another example, at least one of source and detector lens surfaces 102S and 102D are added to their respective ceiling sections 82S and 82D as discrete components. In an example, the clear apertures $CA_S$ and $CA_D$ of source and detector lenses 100S and 100D are between 250 microns and 500 microns, and in a more specific example are between 300 microns and 400 microns, but other suitable diameters are possible.

In an example, module body 12 is made of a material that is substantially transparent to light being transmitted (i.e., source light 356S and detector 356D, introduced and discussed below) having an infrared (IR) wavelength λ, such as an IR wavelength λ in the range of 800 nm to 1100 nm, which is the wavelength range of VCSELs used in forming optical data links. However, the material of the module body 12 may be selected so that it is substantially transparent to light at other wavelengths. In addition, module body 12 has a refractive index n sufficiently large to provide total-internal reflection at TIR mirror 54 (i.e., an optical turn).

In an example embodiment, module body 12 is formed from a transparent resin such as Polyetherimide (PEI) sold by the General Electric Company under the trademarked name ULTEM® 1010, which has a refractive index of about n=1.64 in the aforementioned IR wavelength range. In an example, module body 12 is monolithic and is formed, for example, by molding, by machining or by a combination of both molding and machining. By way of example, an injection mold is made of steel and is precision micro-machined so that the features of module body 12, including source and detector lenses 100S and 100D, are formed with high precision. However, other methods of manufacture are possible for the module.

Fiber Optic Interface Assembly

Figure 4A:
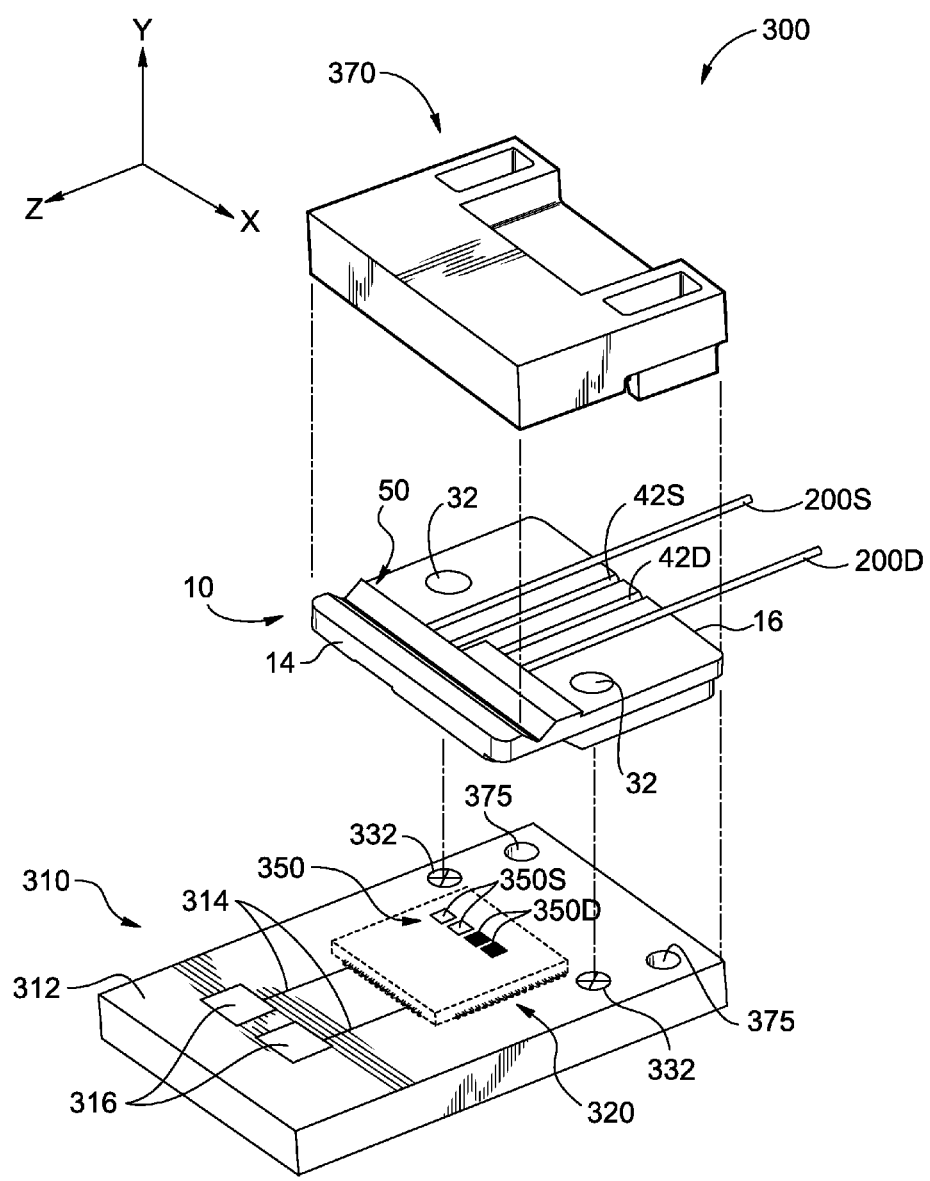
FIG. 4A is a partially exploded view of an exemplary embodiment of a fiber optic interface assembly that includes the fiber optic interface module of FIG. 1, a cover, a printed circuit board (PCB), an integrated circuit (IC) chip operably supported by the PCB and active photo-devices in the form of photodetectors and light sources.
Figure 4B:
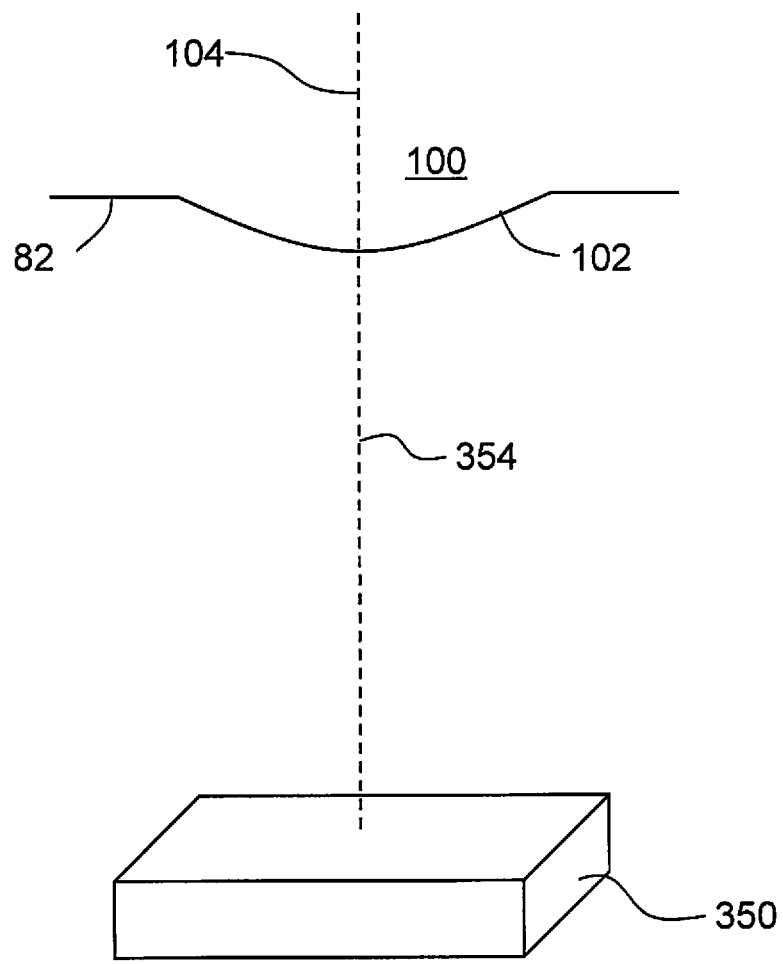
FIG. 4B is a schematic close-up view of an example active photo-device and its device axis, along with a corresponding lens surface, lens and lens axis.
Figure 5:
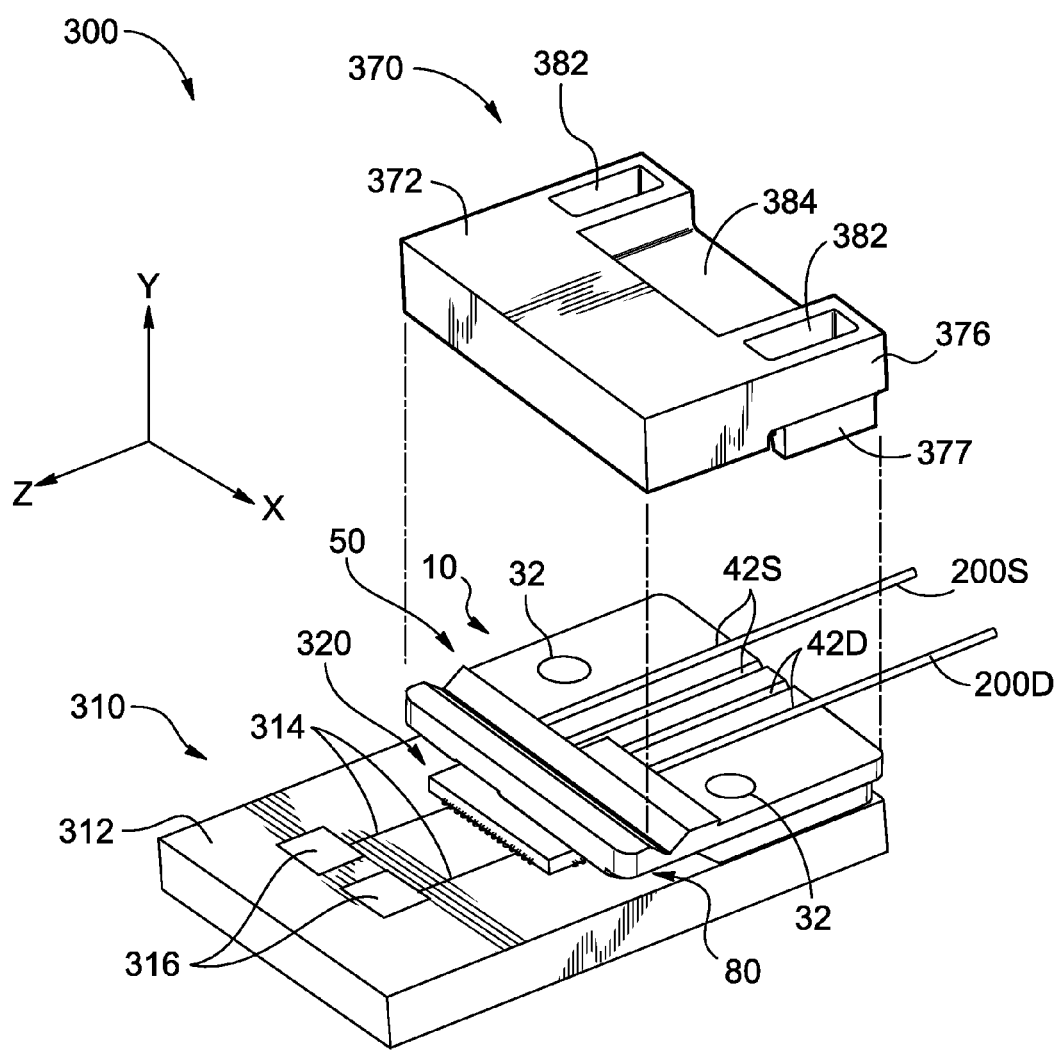
FIG. 5 is a partially exploded view similar to FIG. 4A and shows the fiber optic interface module operably supported by the PCB.
Figure 6:
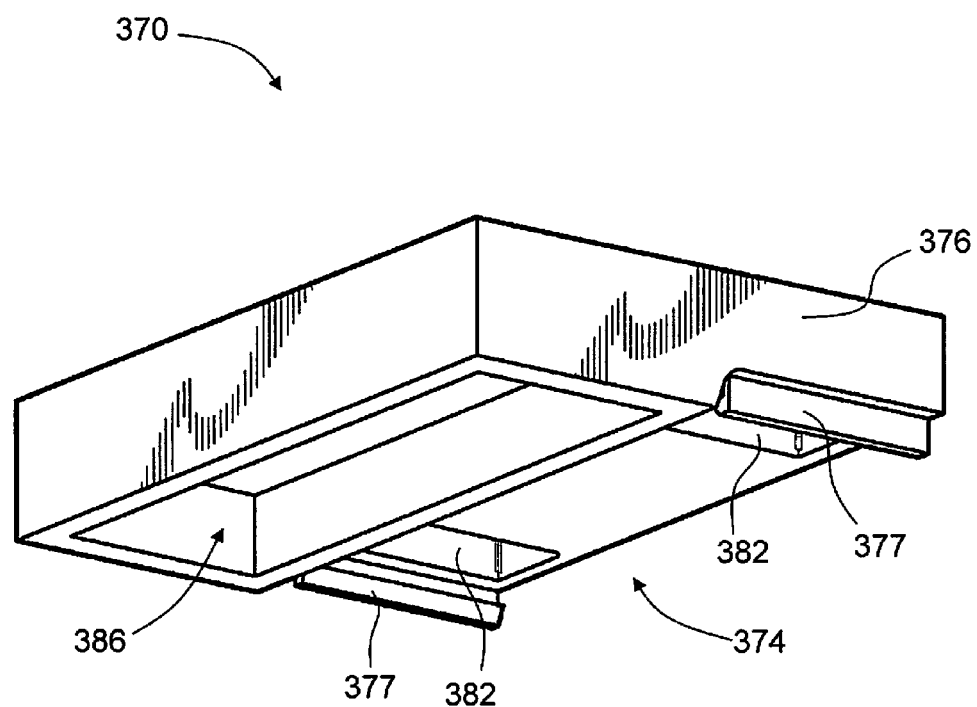
FIG. 6 is a bottom-up view of an exemplary embodiment of the optional cover shown in FIGS. 4a and 5 for the fiber optic interface module.

FIG. 4A is a partially exploded view of an example embodiment of a fiber optic interface assembly ("assembly") 300 that employs module 10. FIG. 4B is a close-up schematic view of an example active photo-device 350 and its device axis 354, along with an example lens surface 102 and the corresponding lens axis 104 of lens 100. FIG. 5 is a partially exploded view similar to FIG. 4A showing module 10 attached to a structure. FIG. 6 is a bottom-up view of an optional cover 370 configured to mate with and cover the top surface 18 of module body 12. Other embodiments may optionally encapsule or otherwise protect the optical attachment or not.

With reference to FIG. 4A and FIG. 5, assembly 300 includes a printed circuit board (PCB) 310 having an upper surface 312 that includes metal wiring 314 (including wire bonds, conductive traces, or the like) and contact pads 316 for making electrical connections. The PCB upper surface 312 operably supports an integrated circuit (IC) chip 320 and/or a plurality of active photo-devices 350 as desired. In an example, IC chip 320 (shown in phantom lines) operably supports a plurality of active photo-devices 350, such as at least one light source 350S that emits source light 356S and at least one photodetector 350D that detects detector light 356D. As shown, the at least one light source 350S and at least one photodetector 350D reside atop the PCB and are electrically connected to IC chip 320 via metal wiring 314. Alternatively, the active photo-devices could be directly attached to the PCB 310 and electrically connected as appropriate, and as illustrated in other exemplary embodiments set forth below.

With reference to FIG. 4B, active photo-device 350 has a device axis 354 along which light travels to or from the photo-device. An example light source 350S is a VCSEL. When an active photo-device 350 comprises a light source 350S, then the device axis is denoted 354S and is referred to as the light-source axis. When an active photo-device 350 comprises a photodetector 350D, then the device axis is denoted 354D and is referred to as the photodetector axis. FIG. 4A shows an example where two light sources 350S and two photodetectors 350D are supported atop IC chip 320, but any suitable number of optical channels in any arrangement is possible as desired.

In an example, light source 350S has a numerical aperture $NA_S$ associated with the emission of light 356S that is equal to or less than the numerical aperture $NA_{FS}$ of source optical fiber 200S. As an non-limiting example, $NA_S=0.26$, which is less than the source optical fiber 200S numerical aperture $NA_{FS}=0.29$ discussed above, but other suitable values for the numerical aperture are possible. Likewise, in an example, photodetector 350D can receive light 356D over a range of angles larger than those associated with a numerical aperture $NA_{FD}$ of detector optical fiber 200D.

In an alternate example as discussed above, one or more active photo-devices 350 are operably supported directly on PCB upper surface 312 and adjacent IC chip 320. In this example configuration, IC chip 320 is electrically connected to the one or more active photo-devices 350 via wire bonds 314 or the like. In an example embodiment, IC chip 320 serves as a light-source driver (e.g., a VCSEL driver), a photodetector signal processor (e.g., a transimpedance amplifier), or both. Thus, IC chip 320 or PCB 310 can serve as a support surface for active photo-devices 350, wherein the support surface is substantially parallel to top surface 18 of module 10 when the module is mounted on or otherwise interfaced with PCB 310.

Note how and FIG. 5 (and also in FIG. 7A and FIG. 7B, introduced and discussed below) recess 80 provides space for IC chip 320 and/or active photo-devices 350, while also providing an adequate stand-off between the active photo-devices and their corresponding lens surfaces 102. Consequently, the module 10 can be used in applications where space is at a premium. In an example, recess 80 defines stand-off heights of HS and HD (see also FIGS. 8A and 9A, introduced and discussed below) associated with light source 350S and photodetector 350D, respectively. In an example, stand-off heights HS and HD are about the same as front focus distances F1S and F1D associated with source and detector lenses 100S and 100D, respectively. The stand-off heights HS and HD are necessary so that source and detector lenses 100S and 100D can be operably spaced apart from light source 350S and photodetector 350D, respectively. Stand-off heights HS and HD can be equal or they may be different as desired.

The source lenses 100S has a back focus distances F2S (FIG. 8A) as measured from end wall 52S of ridge 50. Here, back focus distance F2S is greater than 0, wherein the limit as F2S gets very large represents substantially collimated source light 356S. Detector lens 100D does not have a back focus since light is generated from detector optical fiber 200D. It is noted here that the term "back focus distance" is used herein for the case where the "object" in the form of active photo-device 350 (namely, light source 350S) is not at infinity but rather is located at a front focus distance F1S from source lens surface 102S. Back focus distances F2S resides at or beyond end walls 52S. Non-limiting example embodiments of source lens 100S and detector lens 100D are set forth and discussed below.

With reference to FIG. 4A, PCB 310 may also include one or more fiducials 332 that are used for aligning module 10 to the active photo-devices. Fiducials 332 can have a variety of forms and shapes that facilitate alignment, and are shown herein as crosses or other printed indicia by way of example. Consequently, the fiducials 332 that are printed may be used with or without a vision system for centering the fiducials 332 within respective alignment holes 32 of module 10. Simply stated, the alignment holes 32 and fiducials 332 serve as passive alignment (i.e., optical signals are not being transmitted for measuring the optical signal received) features that are cooperatively configured to provide for passive alignment between module 10 and IC chip 320, and in particular to provide for passive alignment between lenses 100 and their corresponding active photo-devices 350 when module 10 is interfaced with PCB 310. In other embodiments, fiducials 332 may be protrusions that are configured to fit into alignment holes 32 of module 10. Of course, module 10 may be used with active alignment systems, but that complicates the manufacturing process.

In an example, module 10 can be fixed in place on PCB upper surface 312 using a fixing agent such as epoxy or the like. By way of example, a vision system (e.g., a machine vision system) can be used to establish the alignment of module 10 with PCB 310 by viewing fiducials 332 through alignment holes 32 and aligning them therewith prior to these components being interfaced, such as illustrated in the exploded view of FIG. 4A. Moreover, the vision system can have a look-up and/or a look-down function for conducting the passive alignment. In addition, PCB 310 can optionally include alignment holes 375 that serve as additional passive alignment features that are configured to receive the corresponding optional alignment posts 75 (see FIG. 2) of module 10 to further assist the passive alignment of the module with the PCB.

With reference to FIGS. 5 and 6, cover 370 has a top surface 372, a bottom surface 374 and sides 376. If desired, the optional cover 370 may be configured to fit over and be secured to module 10 to prevent contaminants such as dust, dirt, etc. from getting onto the module 10. In particular, cover 370 serves to prevent TIR mirror 54 from coming into contact with contaminants, which can act to reduce the TIR effect. In an example, cover 370 is configured to press optical fibers 200 down into optical fiber support features 42 to keep them aligned during the assembly process in which, in one example, a curable epoxy is used to hold the optical fibers in place.

The top surface 372 of cover 370 includes one or more optional holes 382 and a recess 384 that serve to enhance the fit of the cover to module 10 and that can also be used for handling the cover. The bottom surface 374 includes a bottom recess 386 configured to accommodate ridge 50. The sides 376 optionally include downwardly depending flange members 377 that are configured to matingly engage respective ledges 23 of module 10 at sides 22. In an example, flange members 377 and ledges 23 are configured to snap engage so that cover 370 can be snap fit onto (i.e., snap-mated with) module 10. However, other structure for attaching the cover 370 to module 10 are possible.

In an example, cover 370 is made of a suitable molded material such as ULTEM, though the cover need not be transparent to IR wavelengths of light. Example materials for cover 370 include polycarbonate and other types of plastics.

Figure 7A:
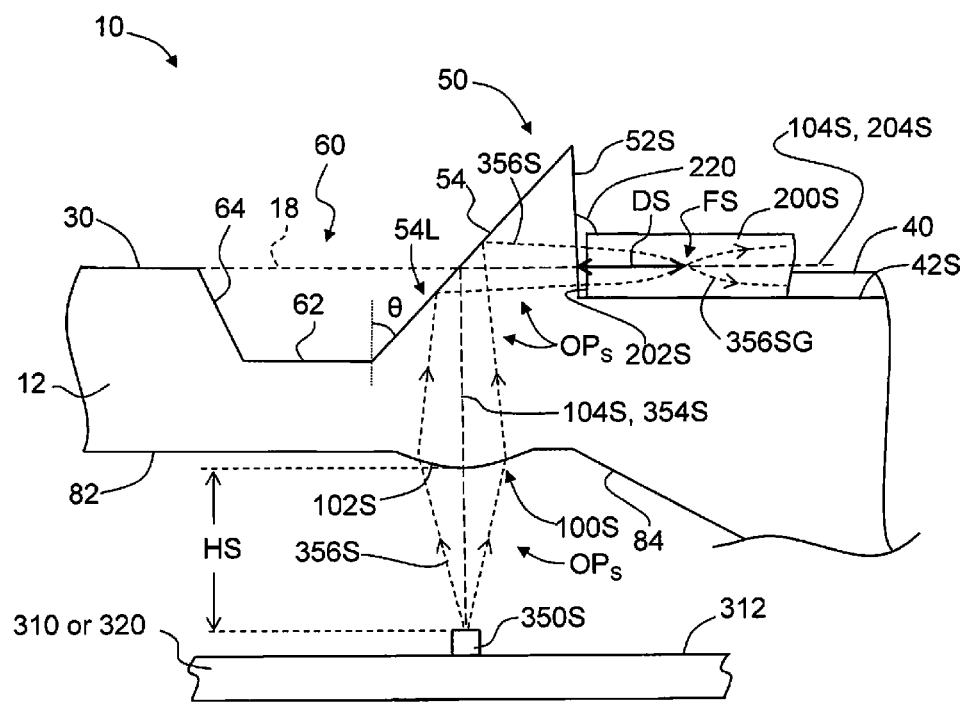
FIG. 7A is a close-up view similar to FIG. 3A and shows the PCB or the IC chip operably supporting the active photo-device in the form of a light source, and also shows the source light from the light source traveling over the folded source optical path through the fiber optic interface module to a focus that resides within the source optical fiber.

FIG. 7A is similar to FIG. 3A and further shows active photo-device 350 in the form of light source 350S residing atop either IC chip 320 or PCB board 310 on surface 312. In the configuration shown in FIG. 7A, light source 350S generates divergent light 356S that travels generally along source lens axis 104S toward source lens 100S over source optical path $OP_S$. The divergent source light 356S is incident upon source lens surface 102S, which has a convex shape and which serves to convert the divergent source light 356S into convergent source light 356S, which then travels within module body 12 along source optical path $OP_S$. The convergent source light 356S is ultimately incident upon TIR mirror 54, which reflects and turns this light such as by substantially 90° so that the source light now travels toward end wall 52S of ridge 50 along source optical path $OP_S$ and toward source optical fiber 200S. The convergent source light 356S travels through end wall 52S and enters source optical fiber end 202S and continues to travel within source optical fiber 200S as guided source light 356SG. The guided source light 356SG follows a curved path by virtue of the gradient-index core 206S of source optical fiber 200S, and forms a focus FS within the core of source optical fiber 200S at a distance DS from optical fiber end 202S. In other words, the focus of source light 356S is within the source optical fiber 200S. Note that source light 356S may pass through a thin portion of index-matching material 220 if such material is disposed between source optical fiber end 202S and end wall 52S.

In an alternate example embodiment similar to that shown in FIG. 7A, source lens surface 102S forms substantially collimated source light 356S that reflects from TIR mirror 54 such as at substantially 90° and exits end wall 52S as substantially collimated light. This embodiment can be used, for example, in certain cases where source optical fiber 200S has gradient-index core 206S and source light 356S is preferably introduced into the core as substantially collimated source light. Note that such a gradient-index source optical fiber 200S will bring source light 356S to focus FS at some distance DS from source optical fiber end 202S, as in the case shown in FIG. 7A.

FIG. 7A illustrates an exemplary embodiment where active photo-device 350 in the form of light source 350S is operably arranged at front focus distance F1S (FIG. 8A) from source lens surface 102S so that it is in optical communication with source optical fiber 200S over folded source optical path $OP_S$. Generally speaking, assembly 300 supports one or more such folded source optical paths $OP_S$ between one or more light sources 350S and corresponding one or more source optical fibers 200S.

Figure 7B:
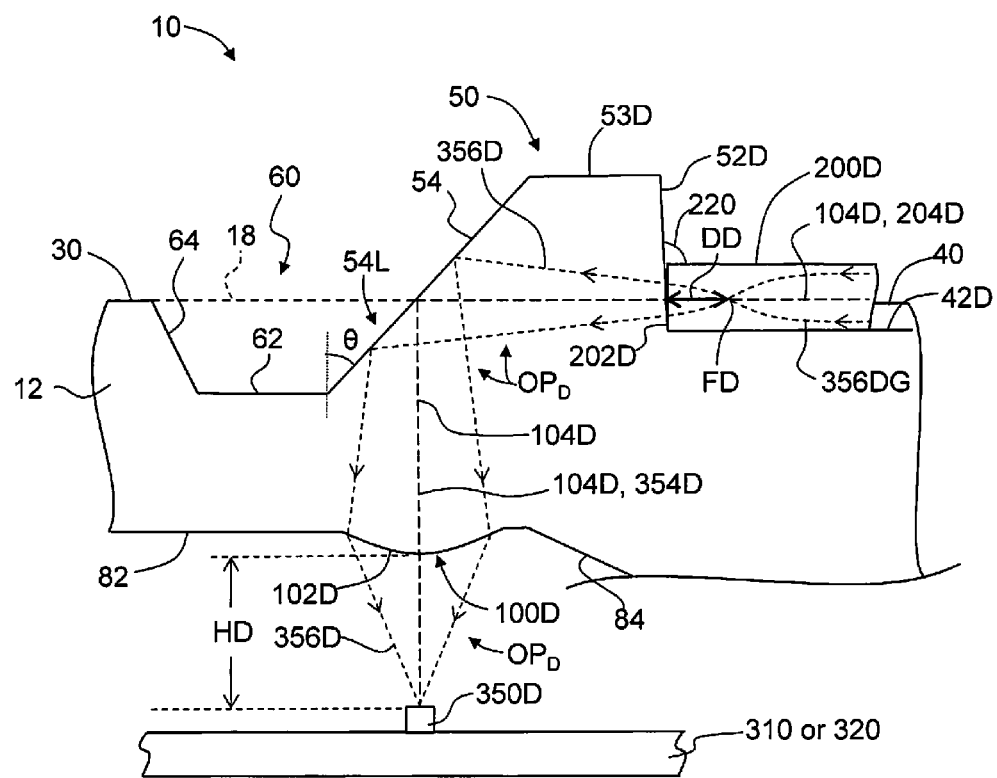
FIG. 7B is similar to FIG. 7A and shows detector light traveling over a folded detector optical path from the detector optical fiber and through the fiber optic interface module to the active photo-device in the form of a photodetector operably supported by the IC chip or the PCB board.

FIG. 7B is similar to FIG. 7A and shows an example where either IC chip 320 or PCB 310 operably supports an active device 350 in the form of photodetector 350D. In the configuration shown in FIG. 7B, guided detector light 356DG travels in detector optical fiber 200D in core 206D toward detector optical fiber end 202D as guided light from a remote light source (not shown) that is optically coupled to a remote end of the detector optical fiber. The guided detector light 356DG is shown following a curved path due to the gradient-index core 206D of the detector optical fiber and appears to originate from focus FD within the detector optical fiber. The guided detector light 356DG exits detector optical fiber end 202D as divergent detector light 356D. This divergent detector light 356D passes through end wall 52D of ridge 50 and into body 12 of module 10 as it travels over detector optical path $OP_D$. Note that detector light 356D travels through extended portion 53D of ridge 50. The detector light 356D may also pass through a thin portion of index-matching material 220 if such material is disposed between detector optical fiber end 202D and end wall 52D.

The divergent detector light 356D is then incident upon TIR mirror 54 and reflects therefrom to make an optical turn and to travel along lens axis 104D over detector optical path $OP_D$. The divergent detector light 356D continues diverging as it travels within module body 12 to detector lens surface 102D. The detector lens surface 102D serves to convert divergent detector light 356D into convergent detector light 356D as it exits module body 12 and travels toward photodetector 350D. The convergent detector light 356D is generally focused down onto photodetector 350D. The photodetector 350D receives this focused detector light 356D and converts it into an electrical signal (not shown), such as a photocurrent that is directed to IC chip 320 to be processed therein or directed elsewhere for processing.

FIG. 7B illustrates an example embodiment where active photo-device 350 in the form of photodetector 350D is operably arranged at a front focus distance F1D (FIG. 9A) from detector lens surface 102D so that it is in optical communication with detector optical fiber 200D over folded detector optical path $OP_D$. Generally, assembly 300 supports one or more such folded detector optical paths $OP_D$ between one or more detector optical fibers 200D and corresponding one or more photodetectors 350D.

Note that FIG. 7A and FIG. 7B describe two different exemplary portions of the same assembly 300, i.e., an assembly that includes one or more light sources 350S and also one or more photodetectors 350D and their corresponding folded source and detector optical paths $OP_S$ and $OP_D$, respectively.

It is also noted here that source lens 100S and detector lens 100D are configured differently. In particular, the thickness of source lens 100S is smaller than the thickness of detector lens 100D (see also FIGS. 8A and 9A and distances d2S and d2D, respectively). In an example, source optical path $OP_S$ is shorter than detector optical path $OP_D$. In an example, source lens 100S (FIG. 7A) is configured to provide optimal optical communication of source light 356S between source optical fiber 200S and light source 350S, and detector lens 100D (FIG. 7B) is configured to provide optimal optical communication of detector light 350D between detector optical fiber 200D and photodetector 350D. Explanatory designs for source lens 100S and detector lens 100D are set forth below, but other suitable designs using the concepts disclosed herein are possible.

An advantage of assembly 300 is that it includes a single solid-air interface for source optical path $OP_S$ and a single solid-air interface for detector optical path $OP_D$. Moreover, there is only one surface in each of the source and detector optical paths $OP_S$ and $OP_D$ that has optical power, namely source lens surface 102S for source optical path $OP_S$ and detector lens surface 102D for detector optical path $OP_D$. This has the advantage of reducing Fresnel reflections and reducing the opportunity for contaminants to enter the source optical path $OP_S$ or the detector optical path $OP_D$, which can diminish the optical performance of assembly 300. It also simplifies the fabrication of assembly 300 since a single part provides the optical paths for both transmit and receive optical channels.

Another advantage of assembly 300 is that it provides for passive alignment between active photo-devices 350 and the corresponding optical fibers 200, i.e., since it provides for aligned optical paths between active photo-devices 350 and corresponding optical fibers 200. This is accomplished in an example via one or more passive alignment features shown by way of example here as alignment holes 32 in module 10 and fiducials 332 on PCB 310, and one or more optional alignment posts 75 of the module and corresponding optional alignment holes 375 in the PCB. This passive alignment system obviates the need to employ more expensive and complex active alignment schemes and minimizes cost and time in manufacturing assembly 300.

Another advantage of assembly 300 includes an optical turn in the optical paths at TIR mirror 54 so that respective portions of the source and detector optical path $OP_S$ and $OP_D$ lie parallel to PCB upper surface 312, on which is mounted IC chip 320 and other electronics. This allows a compact construction for optical devices. Another advantage is that having one lens 100 for each optical fiber 200 reduces the complexity and cost of assembly 300. Yet another advantage is that the distance between adjacent optical fibers 200 can be kept small (unlike in beam expander designs), so that assembly 300 can be configured for use with optical fiber ribbons if desired. Another advantage of assembly 300 is that recess 80 allows for IC chips 320 to be positioned very close to active photo-devices 350 for optimum electrical performance (i.e., reduces capacitance and inductance issues associated with longer electrical traces at high data speeds). Yet another advantage of assembly 300 is that it can have a compact form factor that allows it to fit in the limited space available inside most AOC cable connectors, such as USB 3.0 and HDMI connectors.

Source and Detector Optical Systems

Figure 8A:
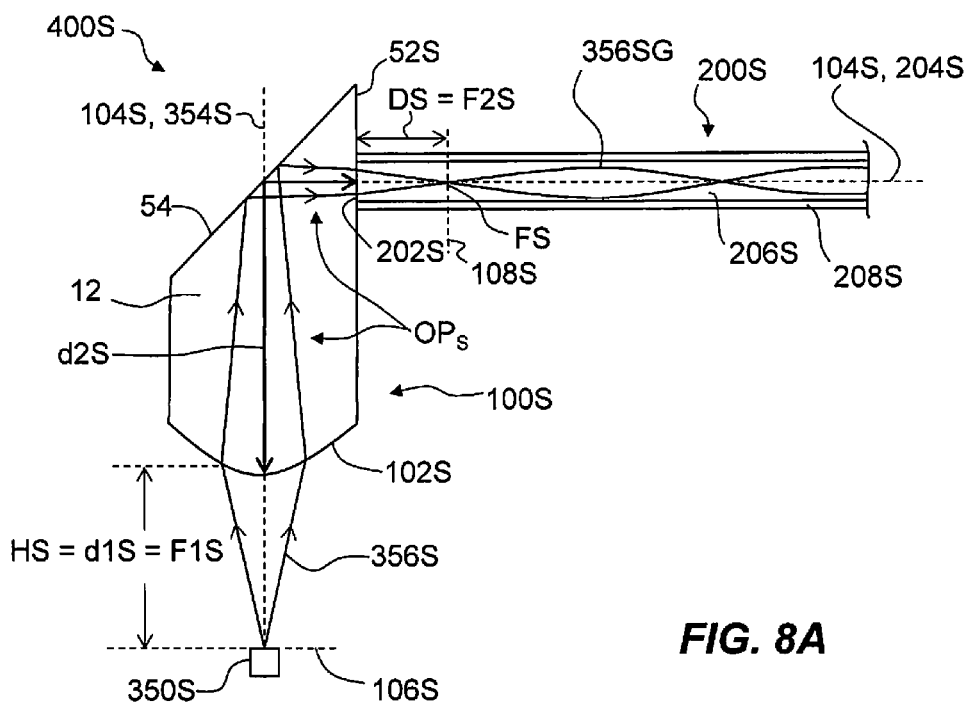
FIG. 8A is a schematic diagram of an explanatory source optical system as formed by the source lens of the fiber optic interface module, the light source and the source optical fiber operably arranged relative to the source lens.

FIG. 8A is a schematic diagram of a source optical system 400S that includes source lens 100S as formed by body 12 of module 10 as described above. The source lens 100S includes an object plane 106S and a focus plane 108S where source light 356S is brought to its tightest focus FS. The source optical system 400S also includes light source 350S located at object plane 106S. As discussed above, end wall 52S defines the rear lens surface for source lens 100S, while source lens surface 102S defines the front lens surface. As mentioned above, source optical fiber core 206S may have a gradient-index profile, in which case it constitutes a second lens element in source optical system 400S.

In an example, source lens 100S is configured to be substantially optimized to efficiently relay source light 356S from light source 350S and couple it into source optical fiber 200S over source optical path $OP_S$, such as described above in connection with FIG. 7A, while being tolerate to light-source lateral misalignment. Stated another way, larger lateral misalignment tolerances are possible while still achieving the predetermined coupling efficiency.

Figure 8B:
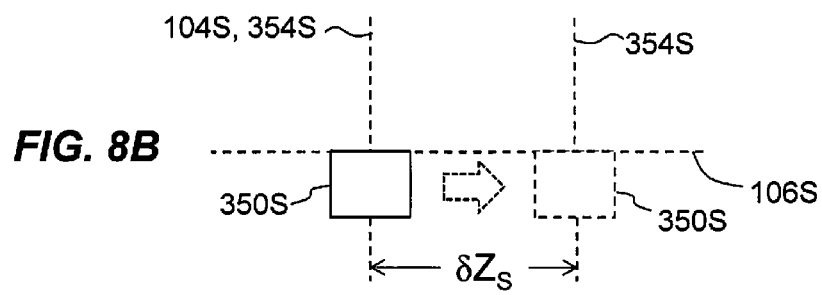
FIG. 8B is a close-up view of the light source showing an example lateral misalignment $\delta Z_S$ of the light source relative to the source lens optical axis.

The conventional wisdom regarding optically coupling a light source to an optical fiber is to focus the light from the light source onto the optical fiber end. Using this approach, it is possible, in theory, to achieve 100% coupling efficiently $CE_S$, neglecting Fresnel losses at any lens/air interfaces. However, such an approach does not offer the most tolerance to light-source lateral misalignment. The coupling efficiently $CE_S$ is defined as the percentage of source light 356S coupled onto source optical fiber 200S as compared to the total amount of source light 356S available (i.e., emitted). FIG. 8B is a close-up view of light source 350S showing an amount $\delta Z_S$ of light-source lateral misalignment relative to source lens axis 104S.

To make assembly 300 tolerant to light-source lateral misalignment, in an example source lens 100S focuses light 356S within source optical fiber 200S (and in particular within its core 206S) so that focus FS is at some distance DS from source optical fiber end 202S. This configuration can still provide for $CE_S$=100% (again, neglecting Fresnel reflections). However, loosening the lateral misalignment tolerances on light source 350S improves the performance of assembly 300, and also reduces the time and cost of putting together the assembly since the allowable alignment tolerance is larger. It also increases the manufacturing yield when manufacturing assemblies 300.

An aspect of the disclosure includes a configuration for source lens surface 102S that provides source lens 100S with an enhanced tolerance to light-source lateral misalignment $\delta Z_S$. In an example, lens 100S is configured to allow larger tolerances than conventional devices while maintaining a predetermined source coupling efficiency $CE_S$ between light source 350S and source optical fiber 200S at 100% or alternatively, at or greater than some threshold coupling efficiency, e.g., $CE_S \geq 90\%$ or $CE_S \geq 85\%$ or $CE_S \geq 50\%$.

Figure 9A:
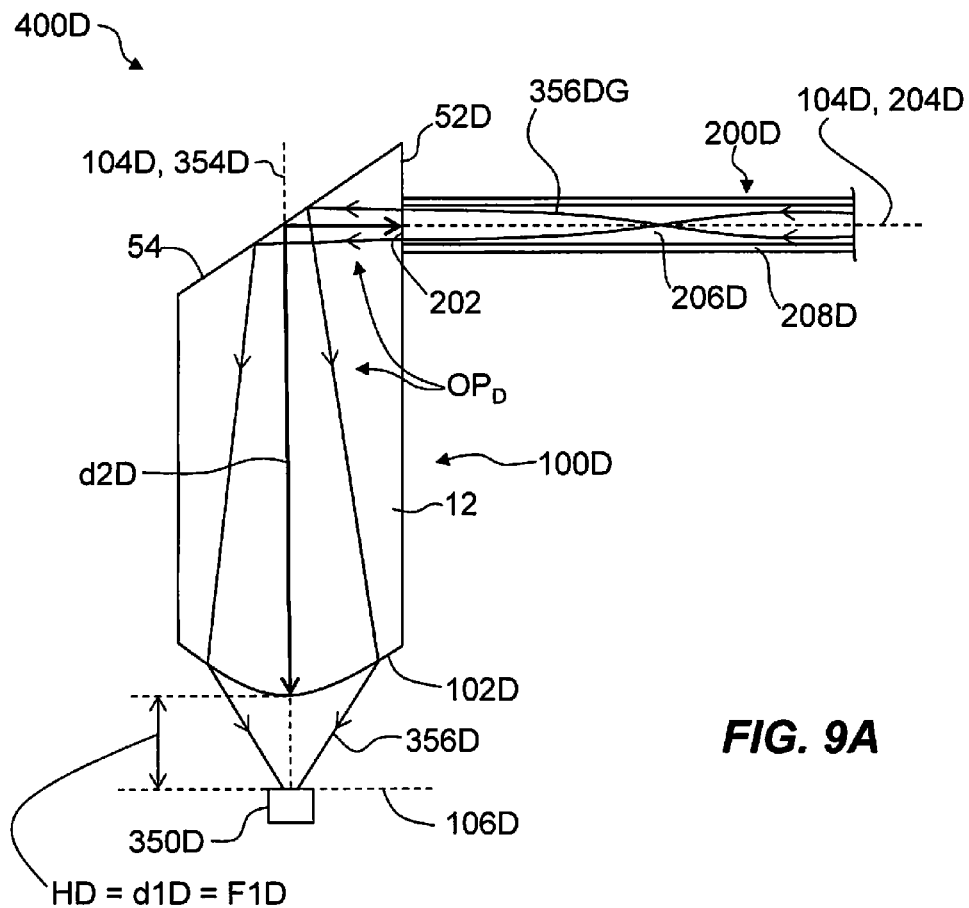
FIG. 9A is similar to FIG. 8A and is a schematic diagram of an example detector optical system as formed by the detector lens of the fiber optic interface module, the photodetector and the detector optical fiber operably arranged relative to the detector lens.
Figure 9B:
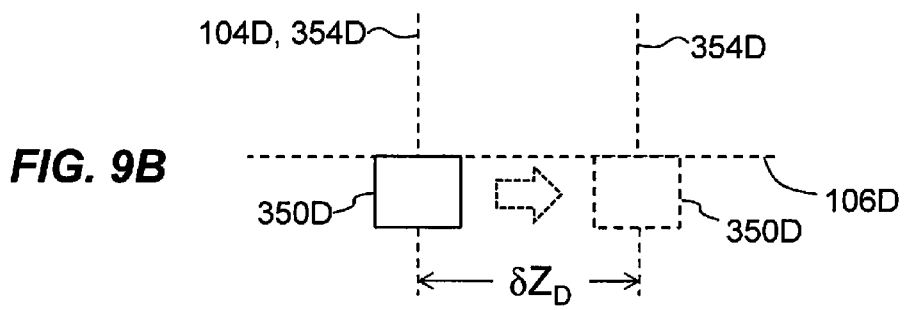
FIG. 9B is similar to FIG. 8B and is a schematic close-up view of the photodetector showing an example lateral misalignment $\delta Z_D$ of the photodetector relative to the detector lens optical axis.

Likewise, with respect to FIG. 9A, an aspect of the disclosure includes a detector optical system 400D similar to source lens 400S and that includes detector lens 100D as formed by body 12 of module 10 as described above. Detector optical system 400D has configuration for detector lens surface 102D that provides detector lens 100D with an enhanced tolerance to photodetector lateral misalignment $\delta Z_D$ (see FIG. 9B). In an example, detector lens 100D is configured to allow larger tolerances than conventional devices while maintaining a predetermined detector coupling efficiency $CE_D$ between detector optical fiber 200D and photodetector 350D at 100%, or alternatively, at or greater than some threshold coupling efficiency, e.g., $CE_D \geq 90\%$ or $CE_D \geq 85\%$ or $CE_D \geq 50\%$.

The detector coupling efficiency $CE_D$ as is used in connection with detector optical system 400D even though the detector light 356D is not coupled into the photodetector 356D per se, but rather is directed to be incident upon its active surface. Thus, coupling efficiency $CE_D$ is the amount of light made incident upon the active surface of photodetector 356D as compared to total amount of light emitted by detector optical fiber 200D.

Example Source and Detector Lenses

In general, there are two parameters that define the shape of a lens surface: its radius of curvature R and the conic constant k. The shape of either source lens surface 102S or detector lens surface 102D is then given by the equation:

$$h(r) = \frac{cr^2}{1 + \sqrt{1 - (1+k)c^2 r^2}},$$

where $c=1/R$ is the curvature and r is the radial position. The conic constant k specifies the nature of the shape of the lens surface: if k=0, the lens surface is spherical; if k is between 0 and −1, the lens surface is elliptical; if k=−1, the lens surface is parabolic; and if k is less than −1, the lens surface is hyperbolic.

There is a wide range of lens parameters that allows for coupling efficiencies $CE_S$ and $CE_D$ to be (theoretically) 100%, and an even wider range of parameters that allows for $CE_S$ and $CE_D$ to be equal to or greater than 90% or equal to or greater than 85% However, it turns out that some combinations of parameters achieve better misalignment tolerances than others for a given coupling efficiency.

Figure 10:
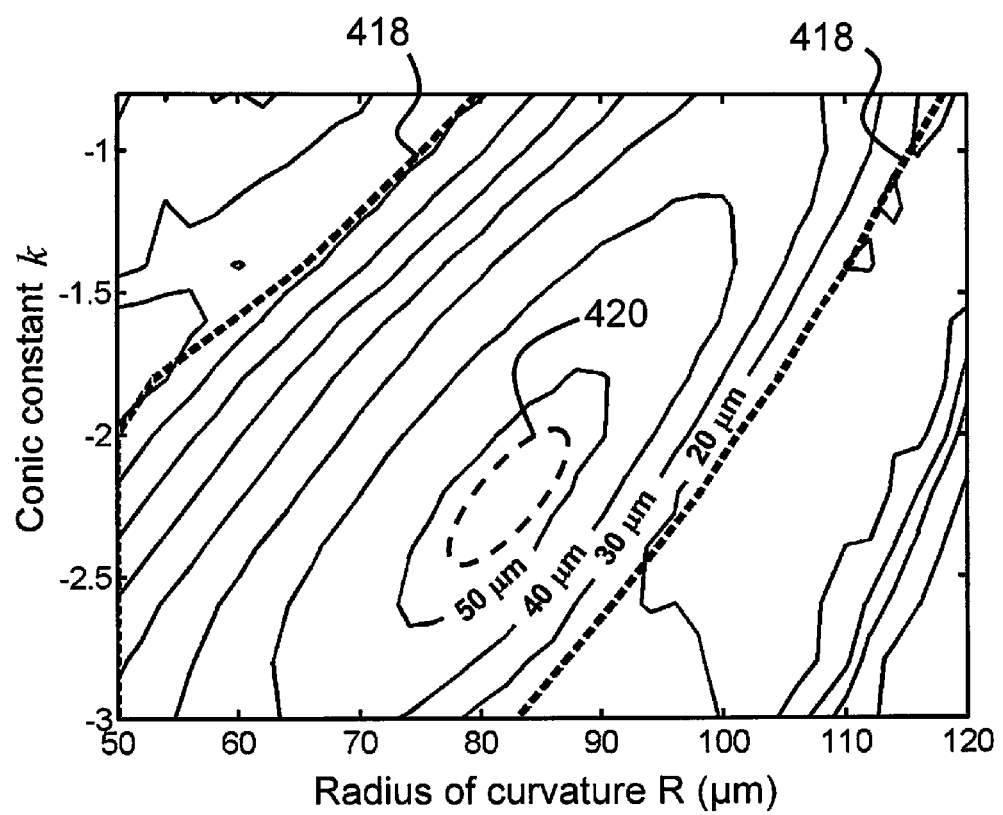
FIG. 10 is a contour plot for the radius of curvature R and the conic constant k with contours of the light-source alignment tolerance $\delta Z_S$, showing the region of (R, k) space that provides the best lateral alignment tolerance while having a coupling efficiency $CE_S=100\%$.

In an example the lens radius R and conic constant k can be varied to arrive at optimum values that support a high misalignment tolerance for select values for the coupling efficiency. FIG. 10 plots for each pair of (R, k) the misalignment tolerance associated with laterally displacing light source 350S by a light-source lateral misalignment $\delta Z_S$ and recording the range for $CE_S > 90\%$. The contours represent the tolerance on the lateral light-source misalignment $\delta Z_S$ for maintaining $CE_S > 90\%$. In particular, the region bounded inside the dashed lines 418 represents the region $CE_S$=100% (i.e., 100% percent coupling neglecting reflections as in all of the coupling efficiency examples and discussion herein), which may vary with other design. The plot of FIG. 10 includes a region 420 of (R, k) space that offers the greatest misalignment tolerance for the given design. At its peak, the light-source lateral misalignment $\delta Z_S$ reaches a full range of about 52 microns, or a half-range of ±26 microns as shown by the contour plots. This same type of contour plot can be created for the detector lateral misalignment $\delta Z_D$.

In FIG. 10, a radius R of about 80 microns is considered optimum. This value for radius R is on the small side and in practice one would prefer a larger radius to make the lens easier to manufacture. The small value of radius R of FIG. 10 is a consequence of fixing the distance parameter d1S and d2S, which are defined immediately below Example parameters for source lens 100S and detector lens 100D are provided below, wherein the radius R of each is fixed at 125 μm.

With reference to FIG. 8A, the parameter d1S is the distance from light source 350S to source lens surface 102S along source lens axis 104S, and d2S is the (folded) axial distance from the source lens surface to rear lens surface (end wall) 52S, and thus represents the source lens axial thickness. The parameter DS is the aforementioned distance from rear lens surface 52S to focus plane 108S and in an example is the same as the back focus distance F2S. The parameter R' is the radius of curvature of rear lens surface 52S, $CA_S$ is the clear aperture (diameter) of source lens 100S, F1S is the front focus distance, and F2S is the rear focus distance. The light source 350S was modeled as a VCSEL, and source optical fiber 200S was assumed to have a parabolic gradient-index core 206S.

With reference to FIG. 9A, for detector lens 100D, the parameter d1D is the distance from photodetector 350D to detector lens surface 102D along detector lens axis 104D, and d2D is the (folded) axial distance from detector lens surface 102D to rear lens surface (end wall) 52D, and thus represents the detector lens axial thickness. The parameter R' is the radius of curvature of rear lens surface 52S, $CA_D$ is the clear aperture (diameter) of detector lens 100D, and F1D is the front focus distance. Photodetector 350D was modeled as a photodiode having a 70-micron-diameter aperture. FIG. 9A shows a focus FD within core 206D of detector optical fiber 200D. Focus FD (FIG. 7B) occurs by virtue of the gradient-index profile of core 206D. Also, detector light 356D is shown as being substantially collimated at it exits detector optical fiber 200D by way of example. Generally, a gradient-index core 206D does not mean that detector light 356D will necessary by collimated, and generally detector light emitted close to the core center will still diverge according to detector optical fiber numerical aperture $NA_{FD}$, which in an example is about 0.29, but other values are possible.

The explanatory designs for the source and detector lenses 100S and 100D, as set forth below in Table 1 and Table 2 respectively, were derived based on the principles disclosed herein using commercially available optical design software. The optimization of the designs was performed by varying the critical design parameters (see Tables 1 and 2 below) as explained below to obtain the greatest source and detector misalignment tolerances $\delta Z_S$ and $\delta Z_D$, while preserving the maximum coupling efficiencies $CE_S$ and $CE_D$, respectively and are merely representative of the concepts disclosed herein.

TABLE 1

Example Source Lens 100S

| Parameter | Value |
| --- | --- |
| F1S = d1S | 350 microns |
| d2S | 800 microns |
| F2S = DS | 100 microns |
| R | 125 microns |
| R' | ∞ (planar) |
| k | −2.0 |
| n, λ | 1.64 @ 850 nm |
| $CA_S$ | 400 microns |

The conic constant k=−2.0 makes source lens surface 102S aspheric, and in particular hyperbolic. Also, the value of DS=100 microns places focus plane 108S well inside of source optical fiber 200S. In the case where source optical fiber core 206S has a gradient-index profile, the optical fiber core acts as a lens and needs to be accounted for in the optical design of source lens 100S.

TABLE 2

Example Detector Lens 100D

| Parameter | Value |
| --- | --- |
| F1D = d1D | 250 microns |
| d2D | 1,300 microns |
| R | 125 microns |
| R' | ∞ (planar) |
| k | −1.8 |
| n, λ | 1.64 @ 850 nm |
| $CA_D$ | 500 microns |

The conic constant k=−1.8 makes detector lens surface 102D aspheric, and in particular hyperbolic. In the case where detector optical fiber core 206D has a gradient-index profile, the optical fiber core acts as a lens and needs to be accounted for in the optical design of detector lens 100D.

The various example lens parameters were also selected to be consistent with fabrication constraints and a desired small form factor (i.e., small dimensions LX, LY and LZ, examples of which are discussed above) for an injection-molded part. It will be understood by one skilled in the art that other values for one or more of the lens parameters can be employed to account for different configurations for module 10, different types of light sources 350S and photodetectors 350D, a different material for the module, etc., depending on the specific application of assembly 300. The example lens parameters set forth in Tables 1 and 2 represent examples of well-optimized designs for source and detector lenses 100S and 100D, respectively. Equally good optical performance for other example lenses can be obtained by appropriate dimensional scaling and selection of the lens design parameters based on the particular application and configuration of assembly 300.

Figure 11A:
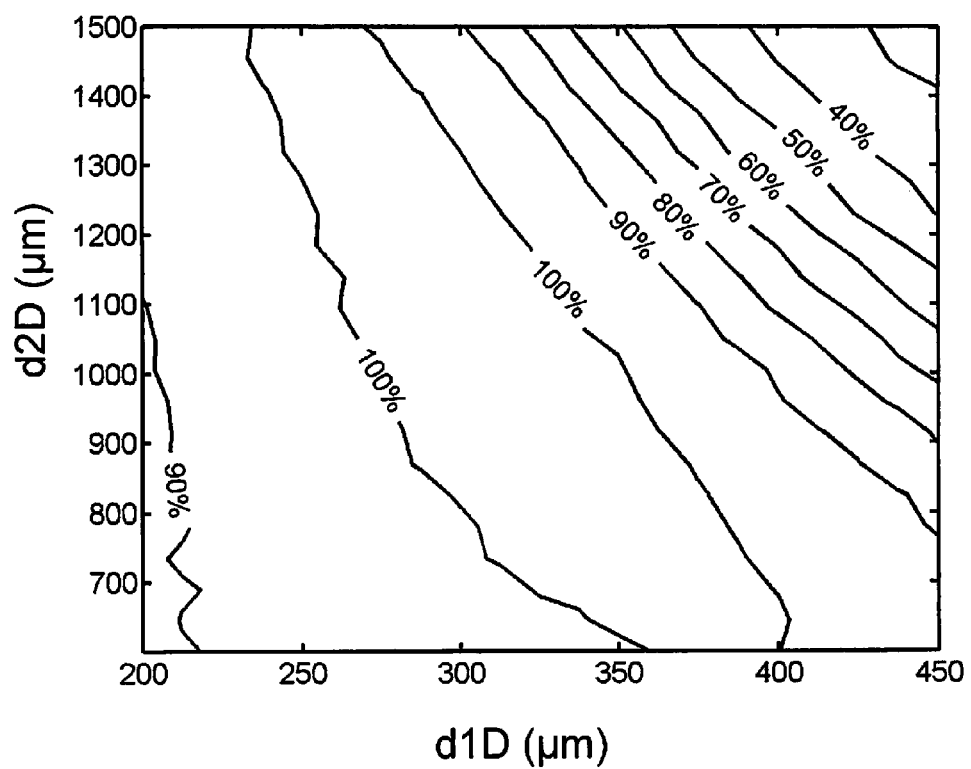
FIG. 11A is a contour plot of the detector coupling efficiency $CE_D$ (%) as a function of the distance parameters d1D and d2D for an example detector lens.
Figure 11B:
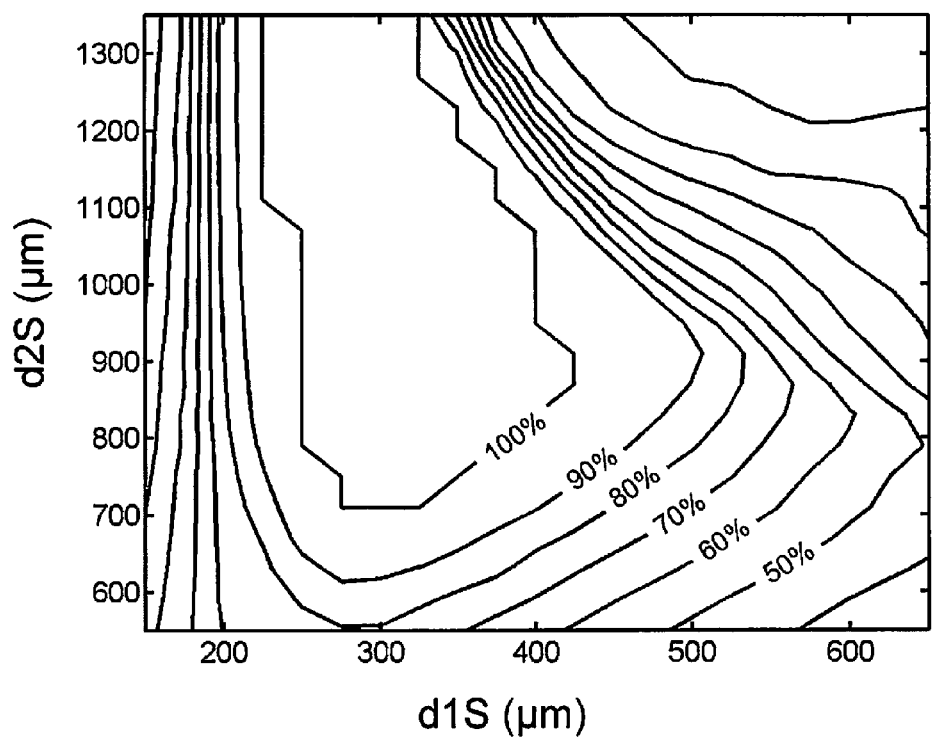
FIG. 11B is a contour plot of the source coupling efficiency $CE_S$ (%) as a function of the distance parameters d1S and d2S for an source lens 100S.

FIG. 11A is a contour plot of the detector coupling efficiency $CE_D$ (%) as a function of the distance parameters d1D (photodetector-to-lens-surface distance) and d2D (fiber-to-lens-surface distance) for the example detector lens 100D set forth above. Similarly, FIG. 11B is a contour plot of the source coupling efficiency $CE_S$ (%) as a function of the distance parameters d1S (photodetector-to-lens-surface distance) and d2S (fiber-to-lens-surface distance) for the example source lens 100S set forth above. The plots of FIGS. 11A and 11B allow for choosing values of d1D and d2D for detector lens 100D and values of d1S and d2S for source lens 100S that accommodate the choice of fixing the radius R of the detector lens surface 102D and the source lens surface 102S to be 125 μm.

Figure 12A:
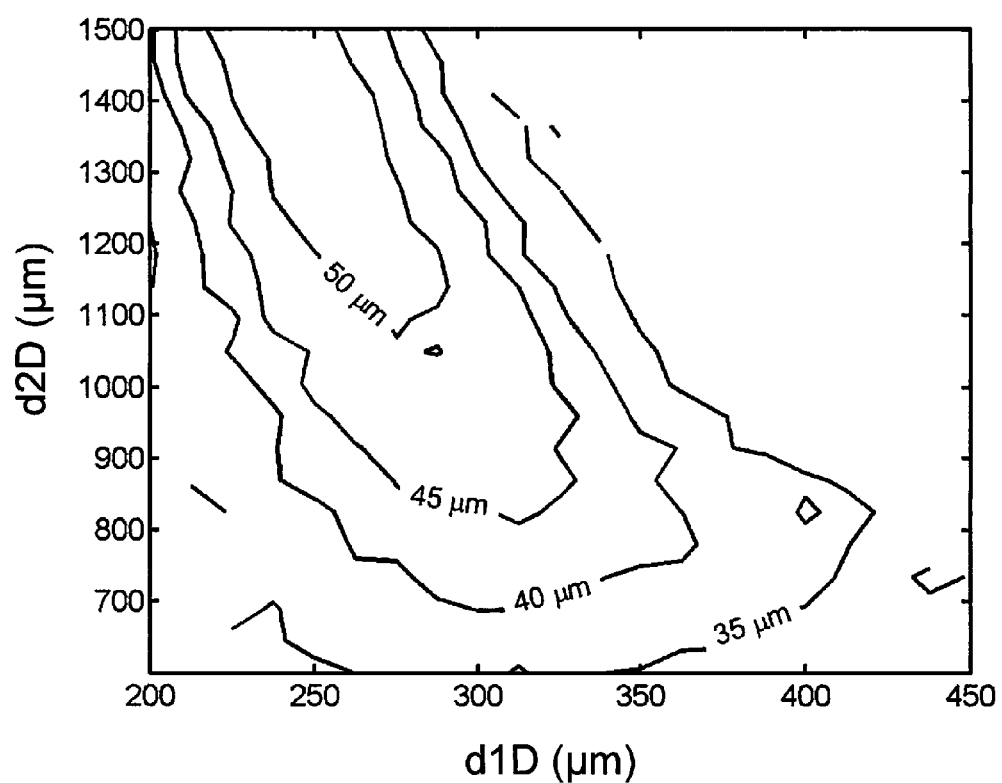
FIG. 12A is a contour plot of the detector lateral misalignment tolerance $\delta Z_D$ (μm) associated with a detector coupling efficiency $CE_D(\%)=90\%$ as a function of the detector distance parameters d1D and d2D associated with the example detector lens 100D.
Figure 12B:
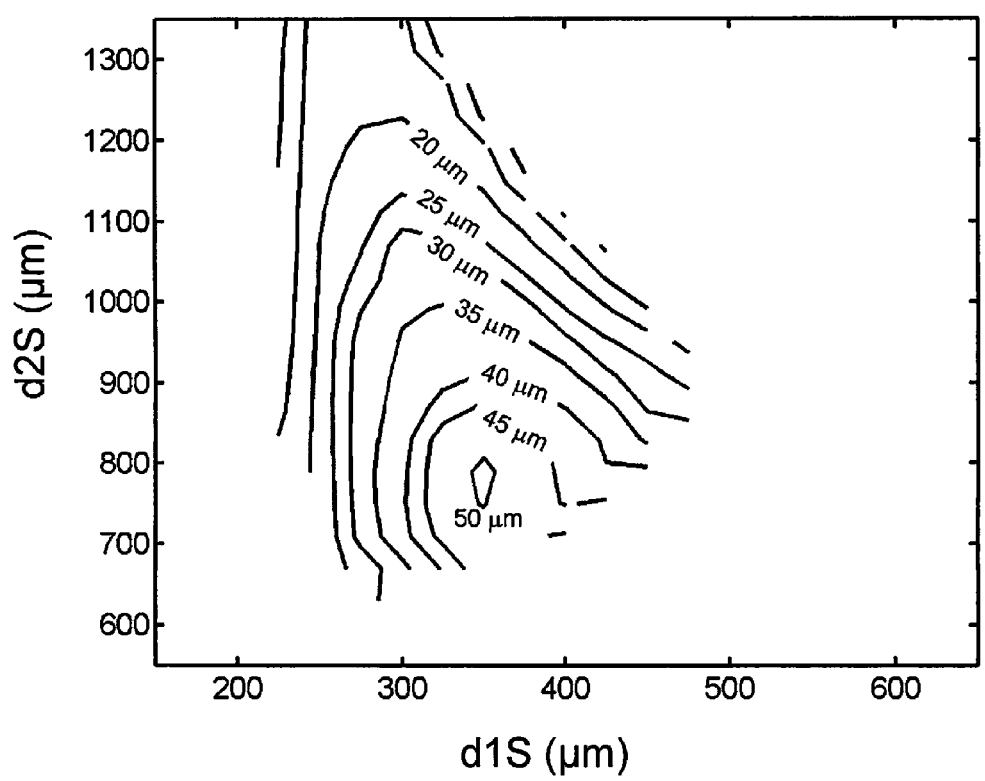
FIG. 12B is a contour plot of the source lateral misalignment tolerance $\delta Z_S$ (μm) associated with a source coupling efficiency $CE_S(\%)=90\%$ as a function of the source distance parameters d1S and d2S associated with the example source lens 100S.

FIG. 12A is a contour plot of the detector lateral misalignment tolerance $\delta Z_D$ (μm) associated with a detector coupling efficiency $CE_D$(%)=90% as a function of the detector distance parameters d1D and d2D associated with the example detector lens 100D. Likewise, FIG. 12B is a contour plot of the source lateral misalignment tolerance $\delta Z_S$ (μm) associated with a source coupling efficiency $CE_S$(%)=90% as a function of the source distance parameters d1S and d2S associated with the example source lens 100S. The plots of FIGS. 12A and 12B allow one to further define choices for distance parameters d1D, d2D and d1S, d2S that provide the optimum tolerance to lateral misalignment for photodetector 350D and light source 350S, respectively.

Figure 13A:
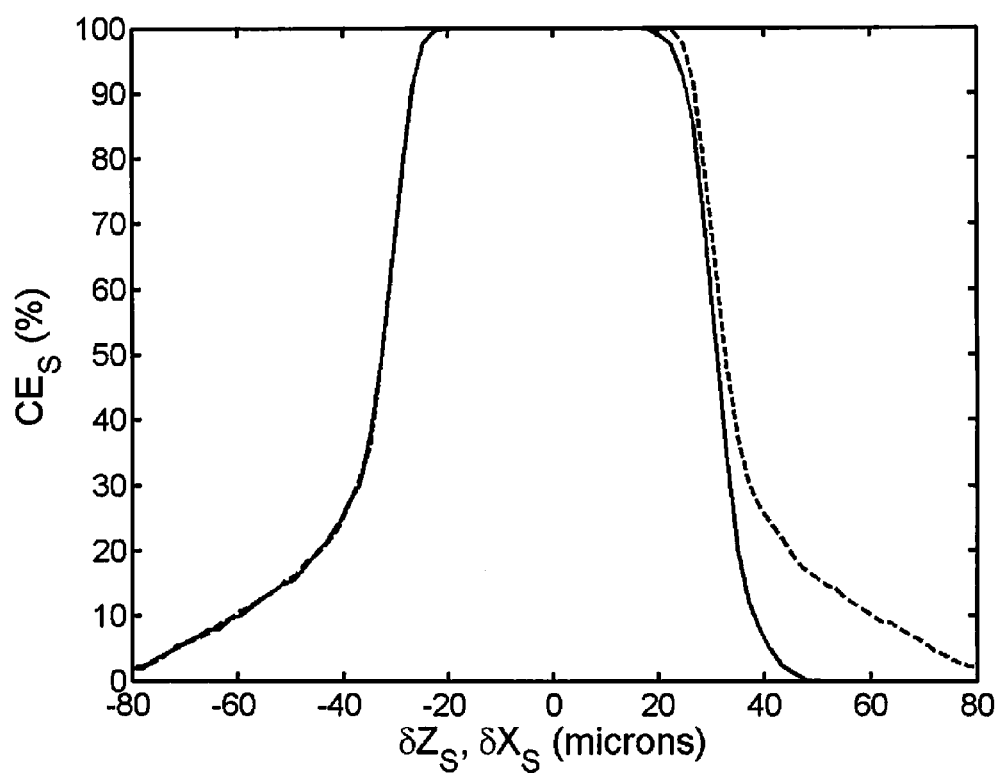
FIG. 13A is a plot of curves showing the source coupling efficiency $CE_S$ (%) versus the light-source lateral misalignments $\delta Z_S$ and $\delta X_S$ respectively in the Z and X directions in microns for the exemplary source lens.
Figure 13B:
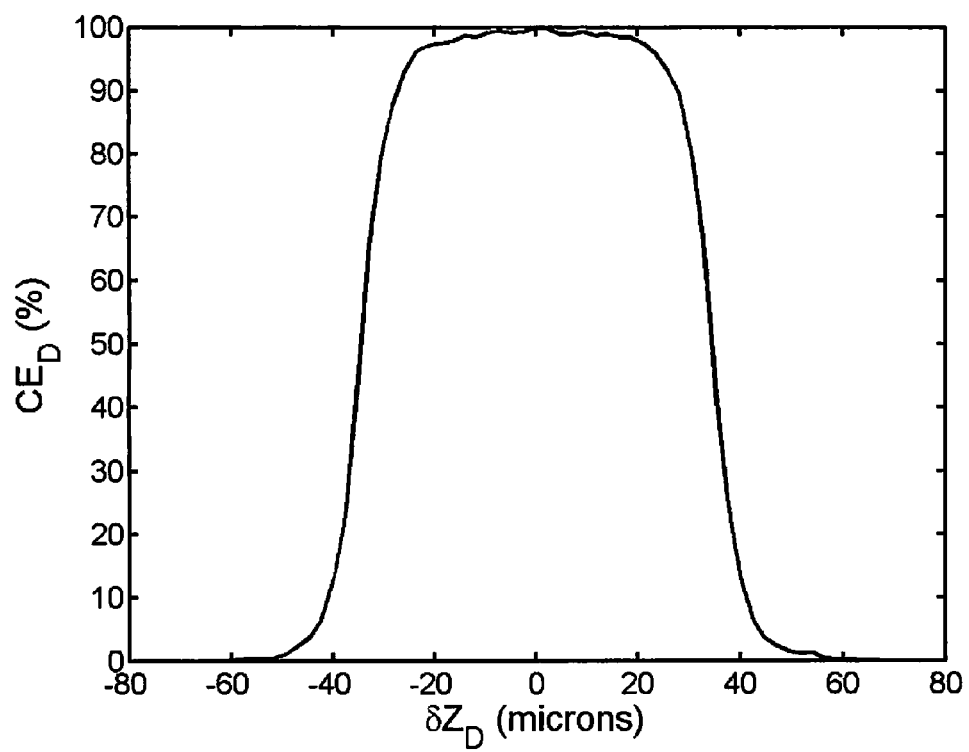
FIG. 13B is a plot of a curve showing the detector coupling efficiency $CE_D(\%)$ versus the detector lateral misalignment $\delta Z_D$ in the Z direction in microns for the exemplary detector lens.

FIG. 13A is a plot of curves for the source coupling efficiency $CE_S$ (%) versus the source lateral misalignment in both the Z-direction $\delta Z_S$ and the X-direction $\delta X_D$ in microns. Specifically, the source lateral misalignment $\delta Z_S$ in the Z-direction is represented by the solid line curve and source lateral misalignment $\delta X_D$ in the X-direction is represented by the dashed line curve. FIG. 13B is a similar plot for the detector lateral misalignment $\delta Z_D$. From the plot of FIG. 12A, for $CE_S \geq 90\%$, the source alignment tolerances in the Z and X directions are about ±26 microns and about ±27 microns, respectively. For $CE_S \geq 50\%$ (the half-power roll-off or above), the source alignment tolerances in the Z and X directions increase to ±32 microns and ±33 microns, respectively. In particular, the curves reveal that the source lateral misalignment in both the Z-direction $\delta Z_S$ and the X-direction $\delta X_D$ using the concepts disclosed provide relatively large misalignment windows for manufacturing while still providing the desired high-levels of coupling efficiency.

Likewise, from the plot of FIG. 13B, for $CE_D \geq 90\%$, the detector alignment tolerance is shown for both the X-direction and the Z direction; however, one curve is visible because the plots are the same for both directions (i.e., the curves lie on top of each other). For $CE_D \geq 90\%$, the detector alignment tolerance in both directions are the same at ±28 microns, while for $CE_D \geq 50\%$, the detector alignment tolerance in the Z direction is ±35 microns. Again, the curves for the detector lateral misalignment in both the X and Z-directions provide a relatively large misalignment window for manufacturing while still providing the desired high-levels of coupling efficiency.

Moreover, the center portions of the curves for both the source and detector alignment tolerance are both relatively flat so the coupling efficiency can be maintained at or near 100% (neglecting reflections) such as 95% or greater with a relatively large misalignment window, thereby advantageously providing easily repeatable manufacturing with consistent coupling results. In other words, the module 10 can have folded lens axes for both the source lens 100S and the detector lens 100D with misalignment tolerances of ±20 microns or greater or even ±25 microns or greater while still maintaining a coupling efficiency for both folded lenses (i.e., source coupling efficiency $CE_S$ and detector coupling efficiency $CE_D$) that in exemplary embodiments is 85% or greater, 90% or greater or even 95% or greater.

Consequently, using the concepts disclosed herein modules and/or assemblies can be constructed that allow quick and easy passive alignment while still maintaining high optical coupling efficiency. In other words, the above values for source lens and detector lens misalignment tolerances are relatively large and are enabled by the design of source lens 100S and detector lens 100D. For lateral displacements of light source 350S and photodetector 350D of about ±20 microns or less, the coupling efficiencies $CE_S$ and $CE_D$ can remain close to 100% (i.e., 85% or greater). Consequently, light source 350S and photodetector 350D can be laterally misaligned by up to about ±20 microns and the respective transmit and receive channels associated with source and detector optical systems 400S and 400D respectively, will not suffer a substantial decrease in the amount of source and detector light 356S and 356D transmitted over the respective source and detector optical paths $OP_S$ and $OP_D$. This relative insensitivity of source and detector lenses 100S and 100D to lateral misalignment advantageously allows for a high performance, low-cost assembly 300 using the concepts disclosed.

Additional Optical Path Embodiments

Figure 14:
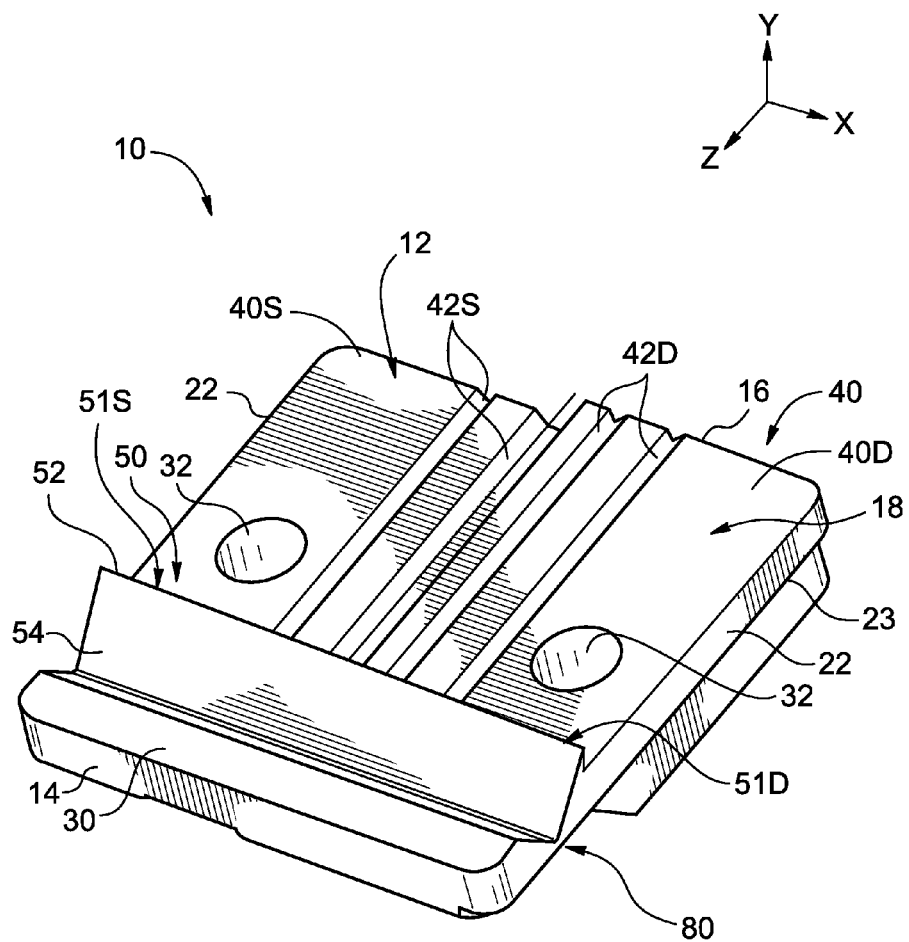
FIG. 14 is similar to FIG. 1 and illustrates an example embodiment wherein the source and detector optical paths of the fiber optic interface module having different lengths by virtue of the main top-surface section having two adjacent portions that have different heights.
Figure 15:
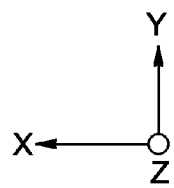
FIG. 15 is an end-on view of the fiber optic interface module that shows the main top surface section and the two adjacent portions that have different heights.
Figure 15:
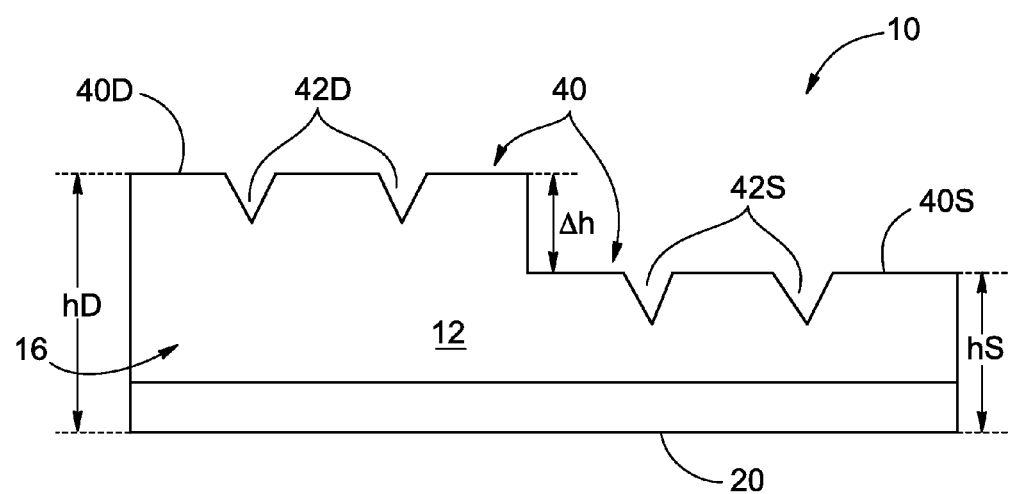

FIG. 14 is a top-down elevated view of an example module 10 similar to that shown in FIG. 1. The bottom-up view is the same as shown in FIG. 2. FIG. 15 is an end-on view of the example module 10 of FIG. 14. FIGS. 14, 15, 16A and 16B illustrate an exemplary embodiment for forming source and detector optical paths $OP_S$ and $OP_D$ that have different lengths. In the instant embodiment, this is accomplished by main top-surface section 40 having two adjacent portions 40S and 40D that have different heights hS and hD (as measured from bottom surface 20), with a height difference Δh=hD−hS as best shown in FIG. 15. Ridge 50 includes source and detector sections 51S and 51D and 52D, respectively. In the examples shown, end wall 52 is planar, i.e., does not include a step, so that support features 42S and 42D have the same length. In an alternate exemplary embodiment, end wall 52 can have a step (see, e.g., FIG. 1) and/or a height difference so that support features 42S and 42D have different lengths.

In an exemplary embodiment, portion 40S of main top-surface section 40 supports two support features 42S associated with light source lenses 100S, while portion 40D supports two support features 42D associated with detector lenses 100D. Meanwhile, source and detector lenses 100S and 100D reside on ceiling 82 as shown in FIG. 2. Thus the difference in the length of source and detector optical paths OPS and OPD is defined by the height difference Δh.

Figure 16A:
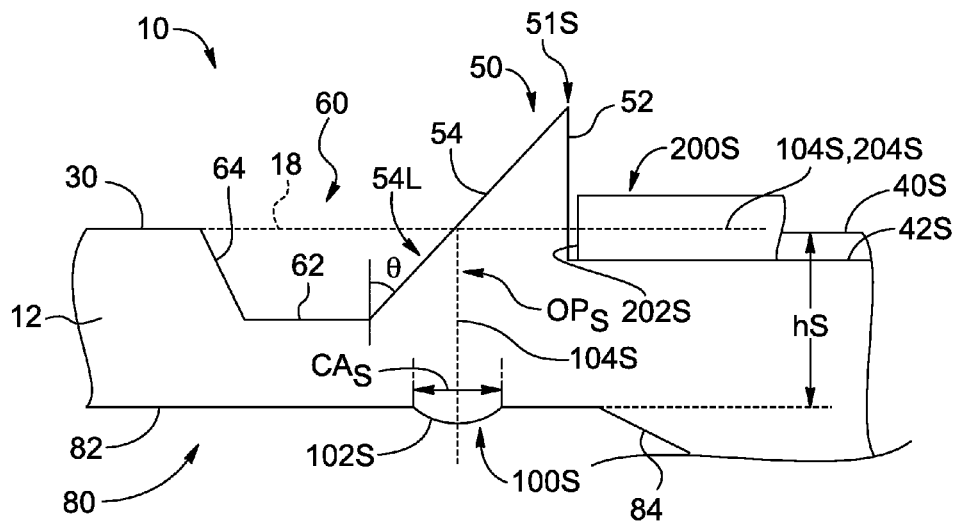
FIGS. 16A and 16B are cross-sectional views of the fiber optic interface module as taken in the Y-Z plane similar to FIG. 3A and FIG. 3B, and illustrate the different lengths of the source and detector optical paths $OP_S$ and $OP_D$ due to the height difference Δh of the adjacent top surface portions.
Figure 16B:
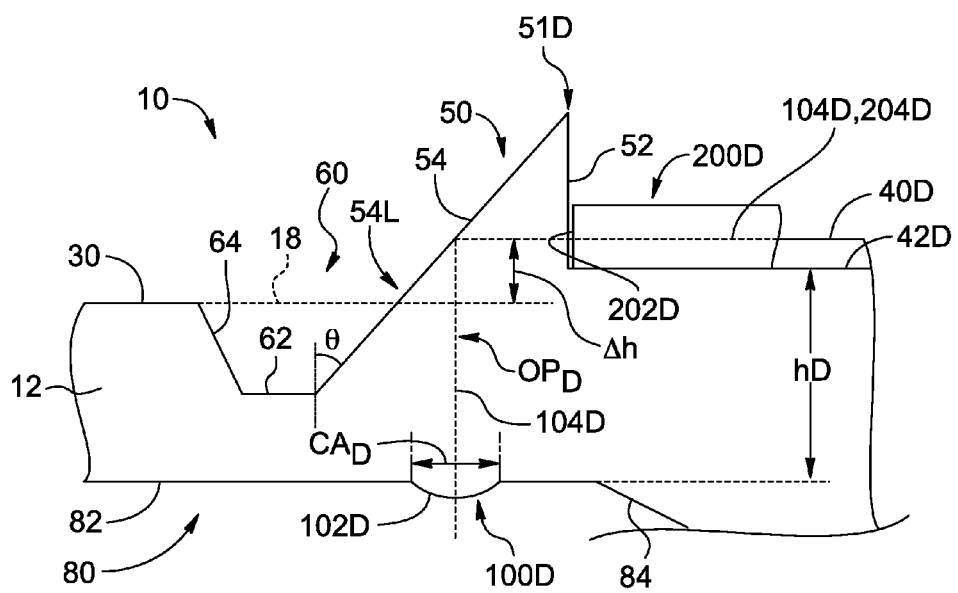
Figure 17:
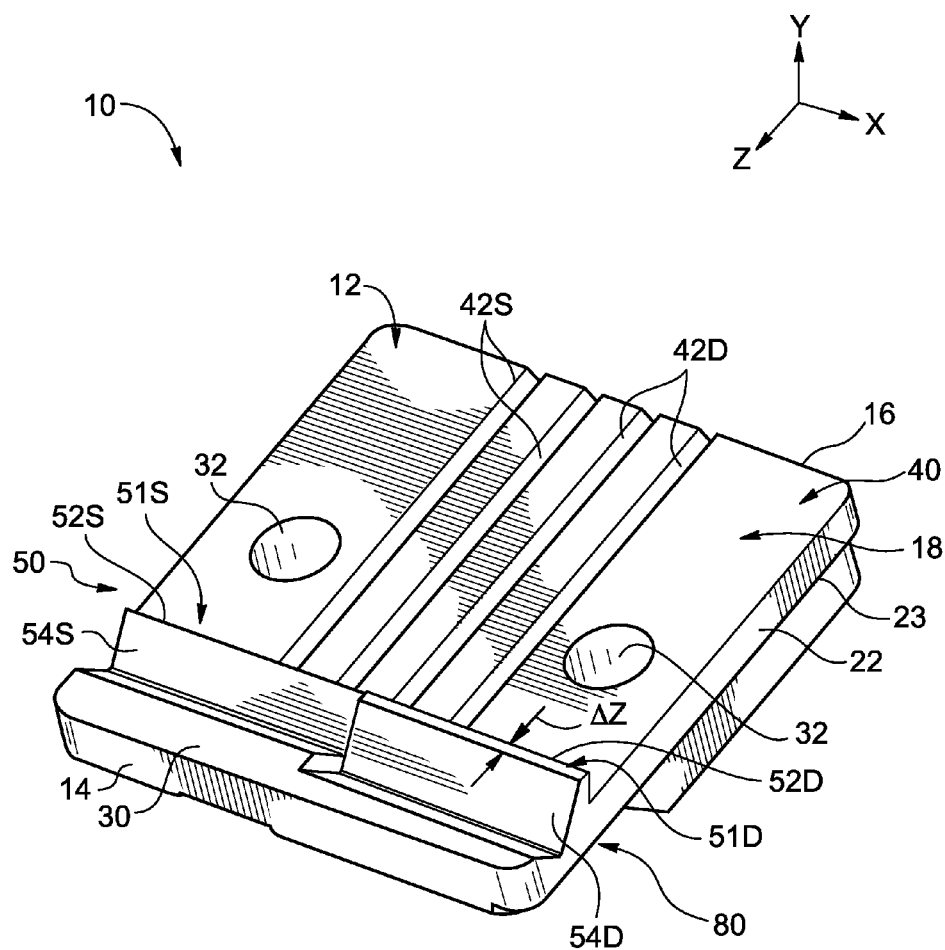
FIG. 17 and FIG. 18 are similar to FIG. 1 and FIG. 2, and illustrate another exemplary embodiment for forming source and detector optical paths $OP_S$ and $OP_D$ that have different lengths by the module body having a displacement between the source and detector sections of the ridge.
Figure 18:
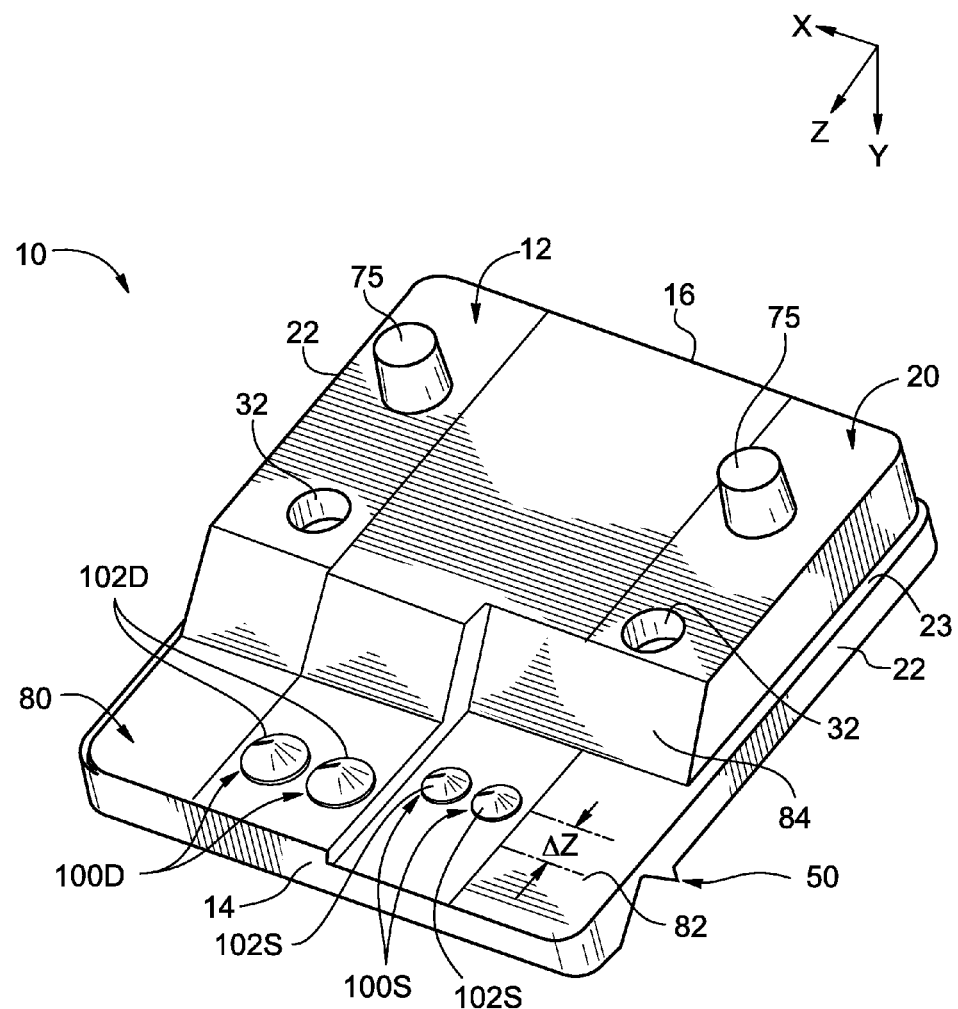

FIGS. 16A and 16B are cross-sectional views of module 10 as taken in the Y-Z plane and illustrate the different lengths of the source and detector optical paths $OP_S$ and $OP_D$ due to the height difference Δh of the adjacent top surface portions 40S and 40D.

Figure 19A:
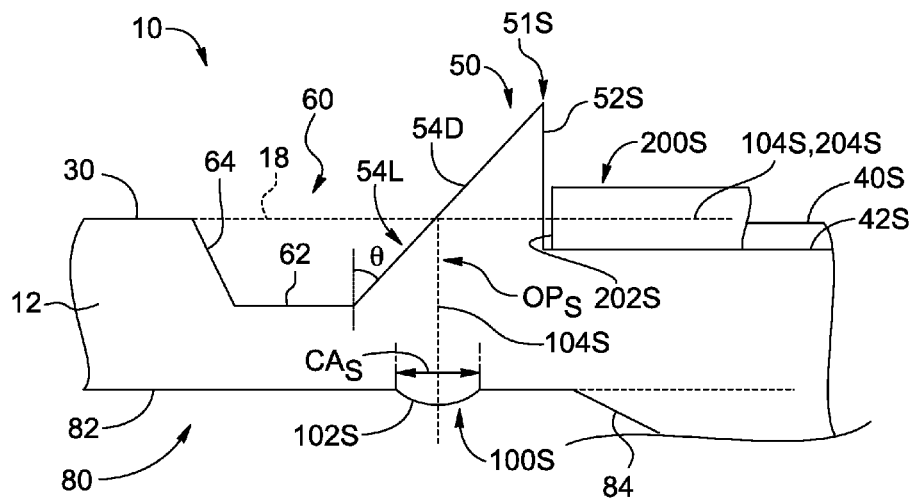
FIG. 19A and FIG. 19B are cross-sectional views taken in different Y-Z planes and are similar to those of FIGS. 16A and 16B, and show the source and detector optical paths $OP_S$ and $OP_D$.
Figure 19B:
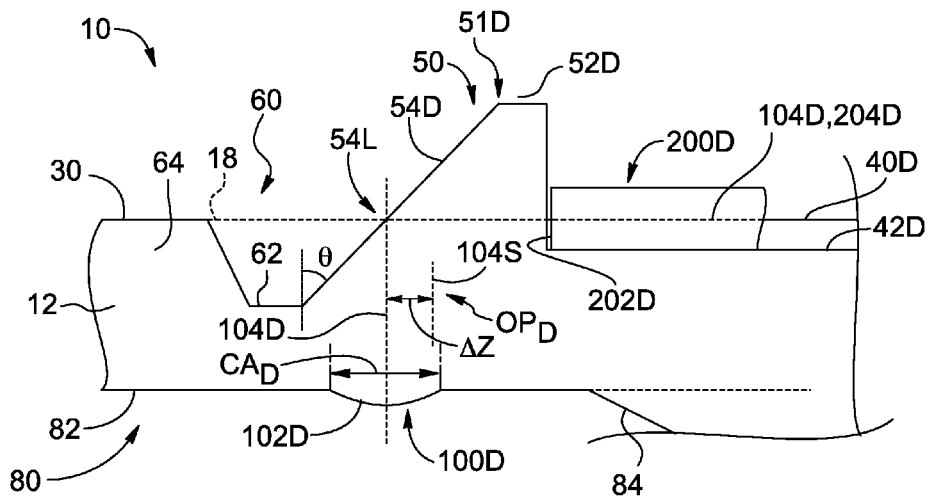

FIG. 17, FIG. 18 and FIGS. 19A and 19B are similar to FIG. 14, FIG. 2 and FIGS. 16A and 16B, respectively, and illustrate another exemplary embodiment for forming source and detector optical paths $OP_S$ and $OP_D$ that have different lengths. FIG. 19A and FIG. 19B are cross-sectional views taken in different Y-Z planes and show the source and detector optical paths $OP_S$ and $OP_D$.

Figure 20:
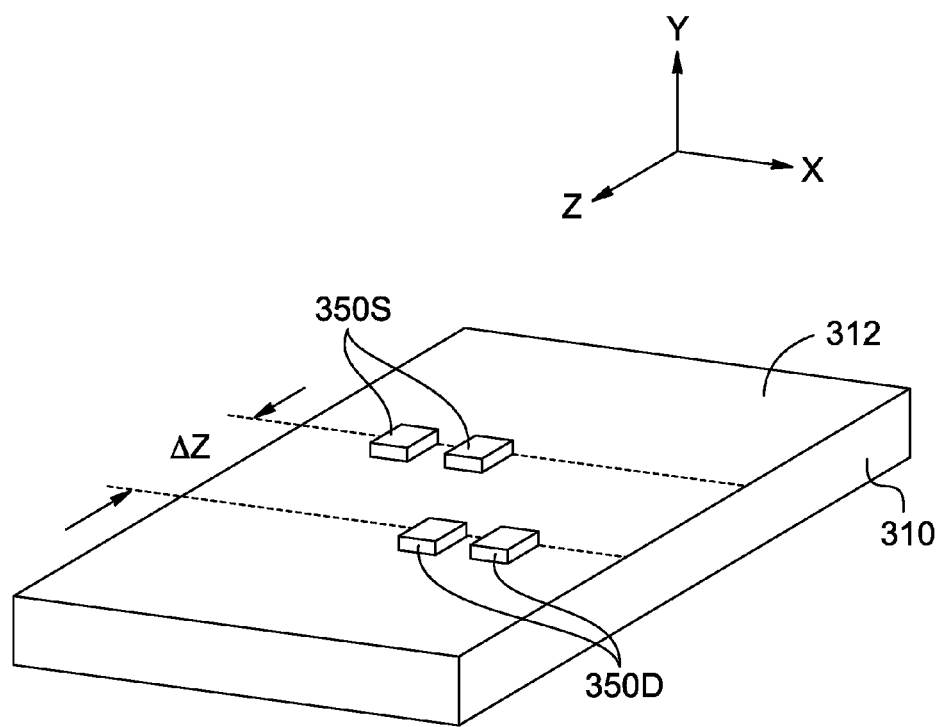
FIG. 20 is an elevated view of an exemplary printed circuit board that shows photodetectors and light sources operably disposed on the surface of the printed circuit board, with the light sources offset from the photodetectors in the Z-direction by an amount ΔZ.

In the instant embodiment, the difference in the source and detector optical path lengths $OP_S$ and $OP_D$ is accomplished by having a displacement between source and detector sections 51S and 51D of ridge 50. This serves to define source and detector angled walls 54S and 54D that are displaced relative to one another in the Z-direction by a difference ΔZ, with the detector section being closer to front end 14 than the light-source section. The difference ΔZ allows source and detector lenses 100S and 100D to reside on a common ceiling 82 but offset by the difference ΔZ. This in turn requires light-source 350S and photodetector 350D to be offset by the same difference ΔZ on surface 312 of PBS 310, as illustrated in the elevated view of PCB 310 of FIG. 20. Thus, the difference ΔZ serves to define the difference in the length of the source and detector optical paths $OP_S$ and $OP_D$. Likewise, the ΔZ path differential length may be used alone or in combination with other geometric differences as desired; although in practice a simple to manufacture design is preferred due to the small size of the device.

Figure 21:
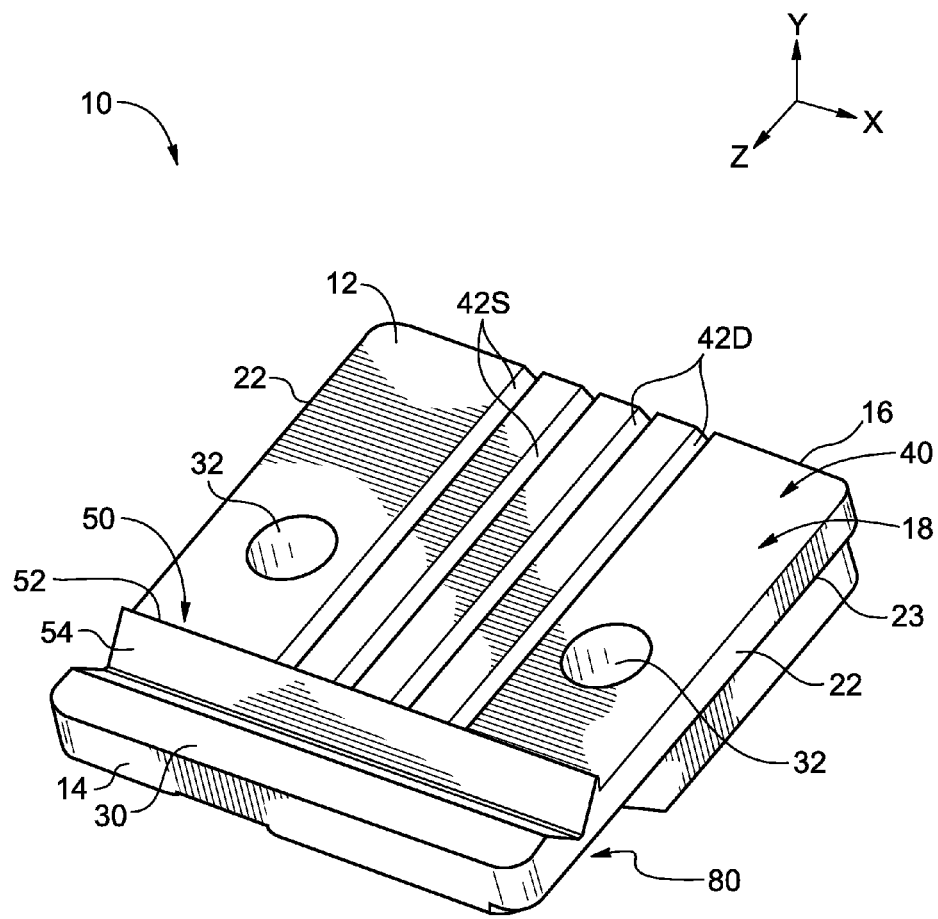
FIG. 21 is similar to FIG. 1, except that the ridge is uniform across the module.
Figure 22A:
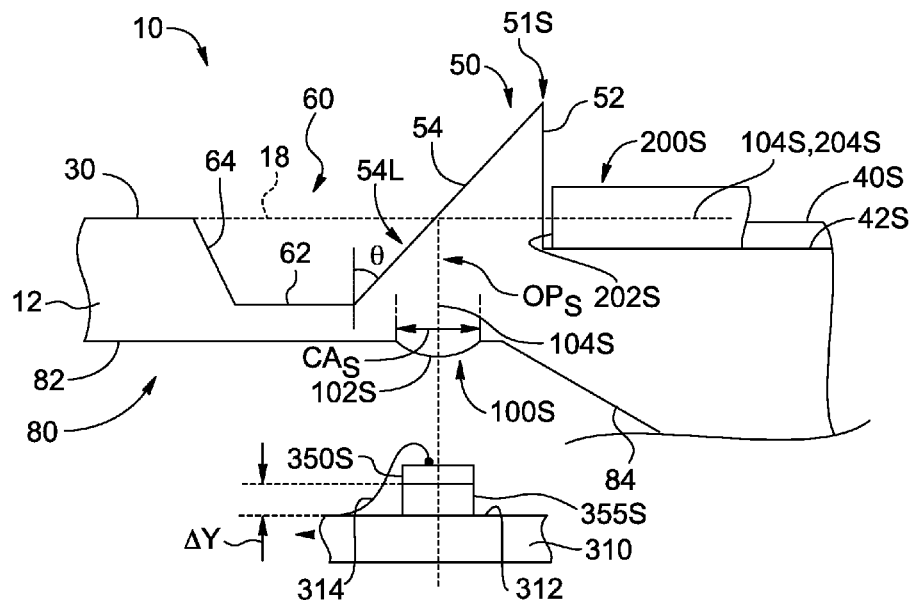
FIG. 22A and FIG. 22B are cross-sectional views taken in different Y-Z planes of the module of FIG. 21, and show the source and detector optical paths $OP_S$ and $OP_D$ for an elevated light source and a photodetector.
Figure 22B:
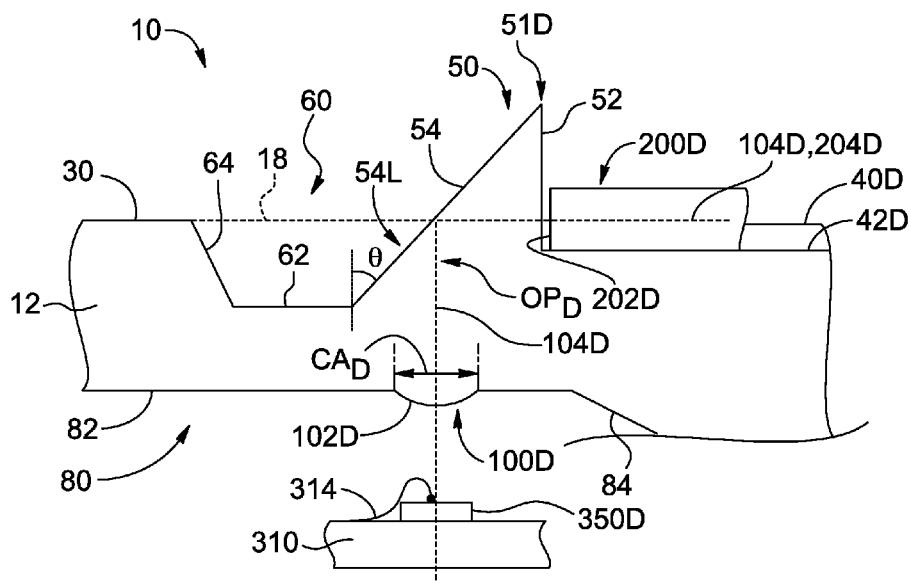

FIG. 21 and FIGS. 22A and 22B and illustrate another exemplary embodiment for forming source and detector optical paths $OP_S$ and $OP_D$ that have different lengths. FIG. 21 is similar to FIG. 1, except that module 10 in FIG. 21 does not have the ridge extension 53D and so is uniform across the module. FIGS. 22A and 22B are similar to FIGS. 19A and 19B, and show the source and detector optical paths $OP_S$ and $OP_D$ along with their respective light source 350S and photodetector 350D. The bottom-up view is the same as shown in FIG. 2.

Figure 23:
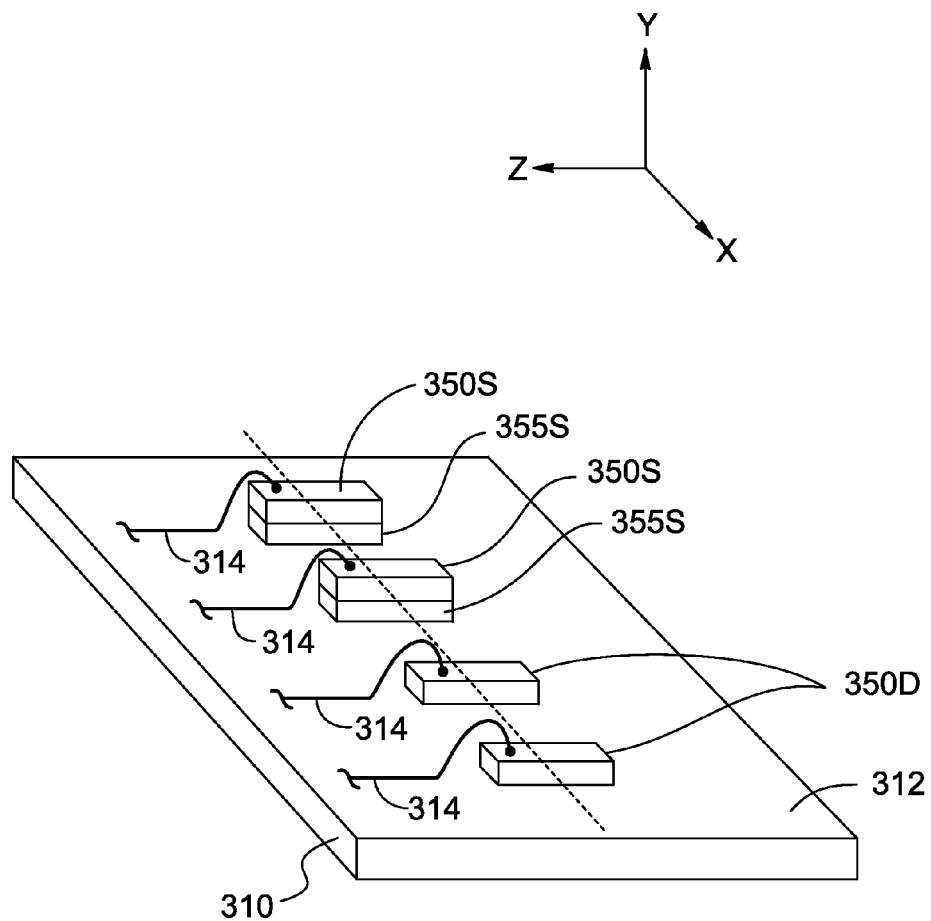
FIG. 23 is an elevated view of light sources and photodetectors operably disposed on the surface of a printed circuit board, with the light sources being elevated by support members relative to the photodetectors.

In the instant embodiment, the difference in optical path lengths $OP_S$ and $OP_D$ are accomplished using a single uniform ridge 50 that has a common end wall 52 so that light source support features 42S and photodetector support features 42D have the same length. FIGS. 22A and 22B and also FIG. 23 illustrate an example configuration wherein light sources 350S and photodetectors 350D are operably supported by PBS 310 but wherein the light sources are elevated relative to PBS surface 312 and the photodetectors thereon by an amount ΔY. In an example, this is accomplished by mounting light sources 350S on one or more support members 355S and then mounting the one or more support pedestals to PBS surface 312. Thus, the difference ΔY serves to define the proper difference in the length of the source and detector optical paths $OP_S$ and $OP_D$.

Example Optical-Electrical Connector

Figure 24:
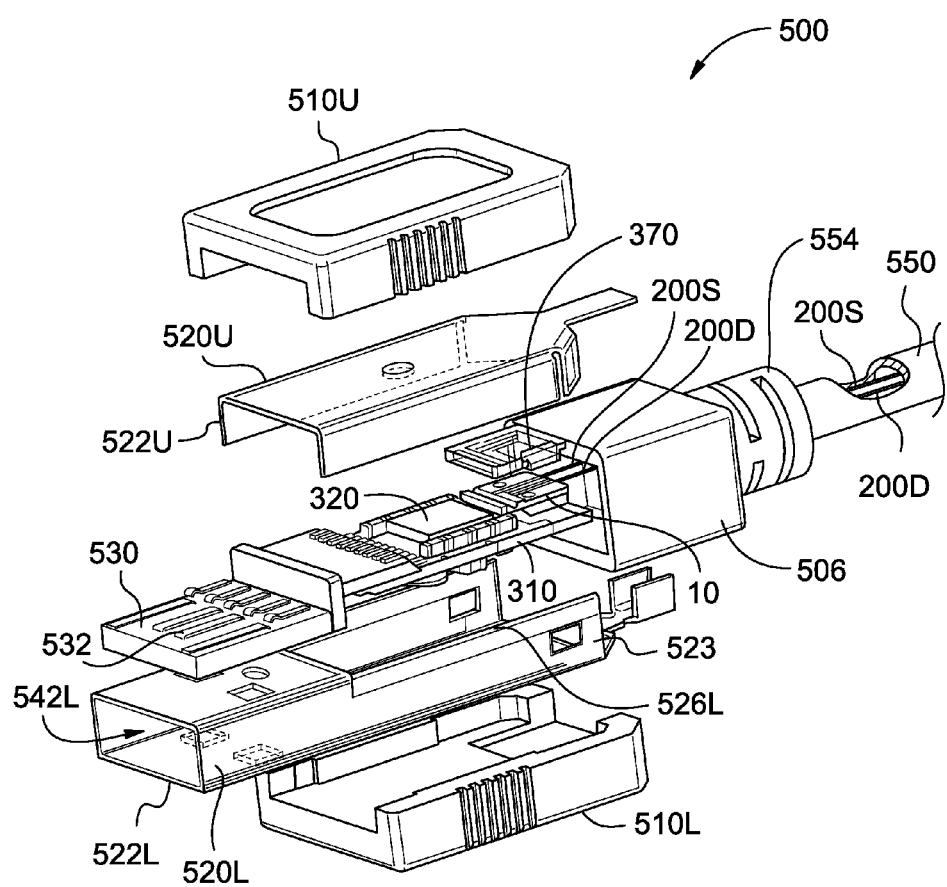
FIG. 24 and FIG. 25 are partially exploded and elevated views of an example optical-electrical (O-E) connector that employs the fiber optic interface assembly as formed using the fiber optic interface module disclosed herein.
Figure 25:
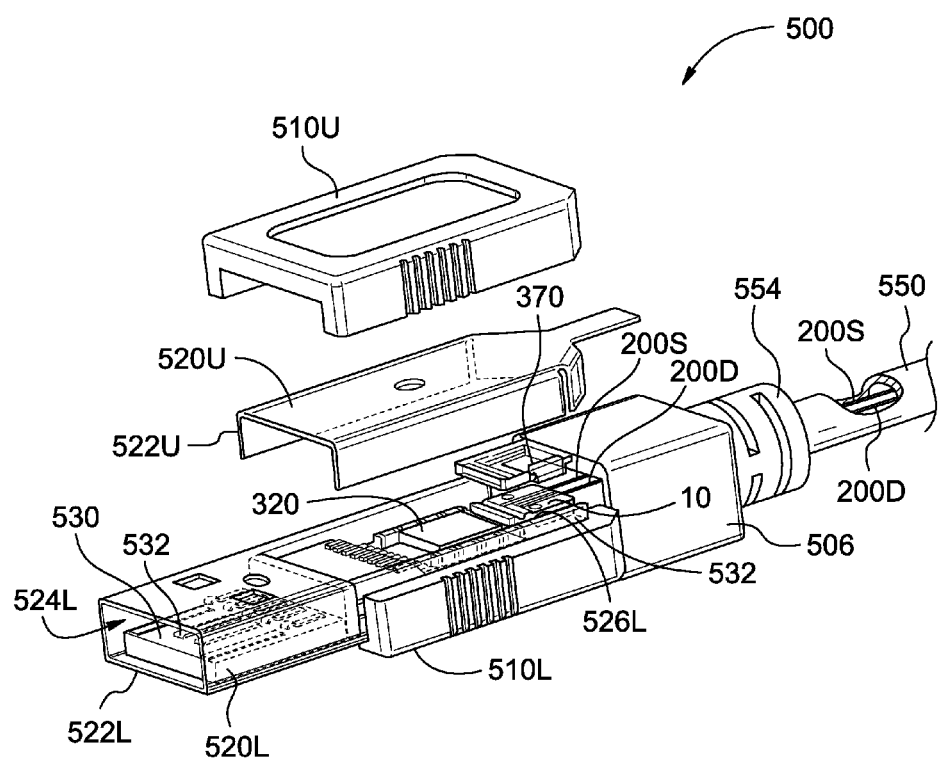

FIG. 24 and FIG. 25 are partially exploded and elevated views of an exemplary embodiment of an optical-electrical (O-E) connector 500 that employs module 10 as disclosed herein. The term "optical-electrical" is used to describe the connector because it performs optical-to-electrical and an electrical-to-optical conversions within the connector. In other words, the connector has electrical contacts for connectivity to a device along with active electronics inside for converting the electrical signals to optical signals and vice-versa for transmission along the optical waveguide such as an optical fiber attached to a module of the connector. However, the modules disclosed herein can have other applications for O-E devices known or further developed.

The O-E connector 500 includes a rear housing 506, and upper and lower outer front shells 510U and 510L that mate to form a connector shell. Upper and lower outer front shells 510U and 510L are configured to accommodate upper and lower metal casing sections 520U and 520L that have respective open front ends 522U and 522L. Lower metal casing section 520L also has an open back end 523L, an interior 524L and uncovered portion 526L, which is covered by upper housing section 520U when connector 500 is assembled to form a (metal) plug interface.

The O-E connector 500 also includes a contact assembly 530 and PCB 310. Contact assembly 520 includes metal contacts 532 and is configured to electrically interface with PCB 310. PCB 310 includes IC chip 320, which is operably connected to at least one light source 350S and at least one photodetector 350D (not shown: see, e.g., FIG. 4A). Module 10 is operably arranged relative to PCB 310, and cover 370 (see also FIG. 6) is disposed over module 10, as shown in the partially exploded view of FIG. 4A. Module 10, cover 370, PCB 310, IC chip 320 and contact assembly 530 are all configured to fit within interior 524L of lower metal casing section 520L by sliding in through its open back end 523L.

Rear outer housing section 506 is operably connected to a fiber optic cable 550 by strain-relief member 554. Fiber optic cable 550 is configured to carry at least two optical fibers 200, and in the example shown carries source and detector optical fibers 200S and 200D. Rear outer housing section 506 is configured to operably engage with front upper and lower outer housing sections when the two sections are mated to encase upper and lower metal casing sections 520U and 520L, which contain module 10, cover 370, PCB 310, IC chip 320 and contact assembly 530.

In an exemplary embodiment such as shown in FIG. 24 and FIG. 25, O-E connector 500 has a USB configuration, but may use any suitable configuration.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

What is claimed is:

1. A fiber optic interface module configured to support first and second optical fibers, comprising:
    a module body having front and rear ends, a top surface, a bottom surface and opposing sides along with optical pathways that are substantially transparent to light having an infrared wavelength;
    first and second optical fiber support features formed in the top surface;
    a ridge formed in the top surface and having first and second end walls defining a step and that respectively terminate the first and second optical fiber support features, and an angled wall that defines a total-internal-reflection (TIR) mirror;
    a recess formed in the module body in the bottom surface adjacent the front end and that defines a ceiling; and
    first and second lens surfaces formed on the ceiling and having respective first and second folded lens axes that are aligned with the first and second optical fiber support features and the TIR mirror, with the first and second lens surfaces and the first and second end walls respectively defining first and second lenses having different first and second folded optical paths with the first and second folded optical paths having different lengths.

2. The fiber optic interface module according to claim 1, wherein the first and second folded lens axes have a misalignment tolerance of ±20 microns or greater while maintaining coupling efficiencies of 85% or greater.

3. The fiber optic interface module according to claim 1, further comprising the first and second lens surfaces being integrally formed by the module body.

4. The fiber optic interface module according to claim 1, wherein the first and second lens surfaces have different curvatures.

5. The fiber optic interface module according to claim 4, wherein the first and second lens surfaces have a hyperbolic shape.

6. The fiber optic interface module according to claim 1, wherein the ceiling respectively has a first planar section and a second planar section, with the first and second planar sections lying in different planes.

7. The optical fiber interface module according to claim 1, wherein the infrared wavelength is in the range of 800 nanometers to 1100 nanometers.

8. The optical fiber interface module according to claim 1, wherein the module body is monolithic.

9. The optical fiber interface module according to claim 1, wherein the optical fiber support features comprise a plurality of grooves that run substantially parallel to the opposing sides.

10. The optical fiber interface module according to claim 1, wherein the top surface includes first and second portions wherein the first and second optical fiber support features are respectively formed, the first and second portions having different heights relative to the bottom surface of the module body.

11. The optical fiber interface module according to claim 1, wherein the ridge includes first and second sections displaced from one another relative to the rear end of the module body.

12. The optical fiber interface module according to claim 1, wherein the ridge includes first and second surface portions that respectively terminate the first and second optical fiber alignment features and that are displaced from one another relative to the rear end of the module body.

13. A fiber optic interface assembly, comprising:
    the fiber optic interface module according to claim 1;
    first and second optical fibers respectively supported in the first and second optical fiber support features, with the first and second optical fibers having respective first and second ends that respectively interface with the first and second end walls of the fiber optic interface module; and
    first and second active photo-devices operably arranged at respective first and second front focus distances from the first and second lens surfaces so that the first and second active photo-devices are in respective optical communication with the first and second optical fibers over the first and second folded optical paths, respectively.

14. The fiber optic interface assembly according to claim 13:
    wherein the first and second active photo-devices respectively include a light source and a photodetector, and wherein the first folded optical path has a shorter length than the second optical path.

15. The fiber optic interface assembly according to claim 13, further comprising:
    a printed circuit board (PCB) that supports the fiber optic interface module;
    at least one integrated circuit (IC) chip operably supported by the PCB and that is operably connected to the first and second active photo-devices; and
    wherein either the PCB or the IC chip operably supports the first and second photo-devices.

16. The fiber optic interface assembly according to claim 13, further comprising:

a cover configured to mate with and cover the top surface of the module body.

17. The fiber optic interface assembly according to claim 13, further comprising:
the first lens being configured to provide a first predetermined misalignment tolerance of ±20 microns for a first lateral offset between the first active photo-device and the first lens axis while maintaining a first coupling efficiency of 90% or greater between the first active photo-device and the first optical fiber; and
the second lens being configured to provide a second predetermined misalignment tolerance of ±20 microns for a second lateral offset between the second active photo-device and the second lens axis while maintaining a second coupling efficiency of 85% or greater between the second active photo-device and the second optical fiber.

18. An optical-electrical connector, comprising:
the fiber optic interface assembly of claim 15;
a contact assembly electrically interfaced with the PCB;
a metal plug interface that operably houses the fiber optic interface assembly and the contact assembly; and
a connector shell that operably houses the metal plug interface.

19. A fiber optic interface module configured to support first and second optical fibers and to interface with first and second active photo-devices, comprising:
a module body having front and rear ends, a top surface configured to support the first and second optical fibers and a bottom surface that supports first and second lens surfaces, wherein the module body is substantially transparent to light having an infrared wavelength;
a ridge formed in the top surface having first and second end walls that respectively terminate the first and second optical fiber support features, and having an angled wall that defines a total-internal-reflection (TIR) mirror;
a first lens defined by the first lens surface, the first end wall, the TIR mirror and a portion of the module body that resides between the first lens surface and the first end wall, the first lens defining a first folded optical path between the first active photo-device and the first optical fiber; and
a second lens defined by the second lens surface, the second end wall, the TIR mirror and a portion of the module body that resides between the second lens surface and the second end wall, the second lens defining a second folded optical path between the second active photo-device and the second optical fiber, wherein the first and second folded optical paths have different lengths.

20. The fiber optic interface module according to claim 19, further comprising:
the first lens being configured to provide a first predetermined misalignment tolerance of ±20 microns for a first lateral offset between the first active photo-device and the first lens axis while maintaining a first coupling efficiency of 85% of greater between the first active photo-device and the first optical fiber; and
the second lens being configured to provide a second predetermined misalignment tolerance of ±20 microns for a second lateral offset between the second active photo-device and the second lens axis while maintaining a second coupling efficiency of 85% or greater between the second active photo-device and the second optical fiber.

21. The fiber optic interface module according to claim 19, wherein the first and second lens surfaces have a hyperbolic shape with different conic constants.

22. A fiber optic interface assembly, comprising:
a fiber optic interface module having a body that is transparent to infrared light and that supports first and second lenses respectively having first and second optical powers defined by first and second lens surfaces, the first and second lenses defining respective first and second folded optical paths of different lengths through the module body, wherein the optical paths of different lengths are provided by a ceiling having a first planar section and a second planar section, with the first and second planar sections lying in different planes of the ceiling;
first and second optical fibers respectively operably supported by the fiber optic interface module, the first and second optical fibers having respective first and second ends that respectively interface with first and second substantially planar surfaces of the first and second lenses; and
first and second active photo-devices that are operably spaced apart from the first and second lens surfaces so that the first and second active photo-devices are in respective optical communication with first and second optical fibers over the first and second folded optical paths, respectively.

23. The fiber optic interface assembly according to claim 22, wherein the first and second active photo-devices are supported on a planar support surface of either an integrated circuit (IC) chip or a printed circuit board (PCB), and wherein the first and second optical fibers are supported on a top surface of the fiber optic interface module, wherein the top surface and the planar support surface are substantially parallel.

24. The fiber optic interface assembly according to claim 22, wherein the module body includes at least one first passive alignment feature and the PCB includes at least one second passive alignment feature cooperatively configured with the at least one first passive alignment feature for allowing for passive alignment between the module and the PCB.

25. The fiber optic interface assembly according to claim 22, wherein the first and second active photo-devices respectively include a light source and a photodetector, and wherein the first folded optical path is shorter than the second optical path.

26. The fiber optic interface assembly according to claim 22, wherein:
the first lens is configured to provide a first predetermined misalignment tolerance for a first lateral offset of ±20 microns between the first active photo-device and the first lens axis while maintaining a first coupling efficiency of 85% or greater between the first active photo-device and the first optical fiber; and
the second lens is configured to provide a second predetermined misalignment tolerance for a second lateral offset of ±20 microns between the second active photo-device and the second lens axis while maintaining a second coupling efficiency of greater than 85% between the second active photo-device and the second optical fiber.

27. An optical-electrical connector, comprising:
the fiber optic interface assembly of claim 22;
a contact assembly electrically interfaced with the PCB;
a metal plug interface that operably houses the fiber optic interface assembly and the contact assembly; and
a connector shell that operably houses the metal plug interface.

28. A fiber optic interface assembly, comprising:
a fiber optic interface module that has a body that is transparent to infrared light and that supports first and second lenses defined on a ceiling having a first planar section and a second planar section with the first and second planar sections lying in different planes of the ceiling, the first and second lenses respectively having first and second optical powers defined by first and second lens surfaces, the first and second lenses defining respective first and second folded optical paths through the module body;

first and second optical fibers respectively operably supported by the fiber optic interface module, the first and second optical fibers having respective first and second ends that respectively interface with first and second substantially planar surfaces of the first and second lenses;

a printed circuit board having a surface that is spaced apart from the first and second lens surfaces;

first and second active photo-devices operably supported on the printed circuit board surface so as to be in respective optical communication with first and second optical fibers over the first and second folded optical paths, and wherein the first active photo-devices have first and second heights relative to the printed circuit board surface that define different lengths for the first and second folded optical paths;

wherein the first lens is configured to provide a first predetermined misalignment tolerance for a first lateral offset of ±20 microns between the first active photo-device and a first lens axis while maintaining a first coupling efficiency of 85% or greater between the first active photo-device and the first optical fiber, and the second lens is configured to provide a second predetermined misalignment tolerance for a second lateral offset of ±20 microns between the second active photo-device and a second lens axis while maintaining a second coupling efficiency of greater than 85% between the second active photo-device and the second optical fiber.

29. An optical-electrical connector, comprising:

the fiber optic interface assembly of claim 28;

a contact assembly electrically interfaced with the PCB;

a metal plug interface that operably houses the fiber optic interface assembly and the contact assembly; and a connector shell that operably houses the metal plug interface.

* * * * *